United States Patent
Nonaka

(10) Patent No.: US 9,137,459 B2
(45) Date of Patent: Sep. 15, 2015

(54) IMAGE PROCESSING DEVICE, DISPLAY DEVICE, IMAGE PROCESSING METHOD, AND COMPUTER-READABLE RECORDING MEDIUM FOR GENERATING COMPOSITE IMAGE DATA

(71) Applicant: Olympus Corporation, Shibuya-ku, Tokyo (JP)

(72) Inventor: Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/528,601

(22) Filed: Oct. 30, 2014

(65) Prior Publication Data
US 2015/0097988 A1 Apr. 9, 2015

Related U.S. Application Data

(63) Continuation of application No. PCT/JP2014/066850, filed on Jun. 25, 2014.

(30) Foreign Application Priority Data

Oct. 3, 2013 (JP) .................................. 2013-208570

(51) Int. Cl.
*H04N 5/265* (2006.01)
*G06T 11/60* (2006.01)

(52) U.S. Cl.
CPC ................ *H04N 5/265* (2013.01); *G06T 11/60* (2013.01)

(58) Field of Classification Search
CPC ..................... H04N 58/23293; H04N 5/23296; H04N 5/265; H04N 5/2625; H04N 5/23245; H04N 5/23238; H04N 5/2628; H04N 2101/00; H04N 1/0045; H04N 1/2125; H04N 1/0035; H04N 1/00469; H04N 1/00458; H04N 1/00283; H04N 13/0296; H04N 13/0285; H04N 13/0239; G06F 3/005; G06F 3/045; G06T 11/60; G06T 3/4038; G03B 35/00; G03B 37/00; G03B 37/02; G03B 37/04
See application file for complete search history.

(56) References Cited

U.S. PATENT DOCUMENTS

| 5,510,830 | A | 4/1996 | Ohia |
| 8,560,090 | B2 | 10/2013 | Sasaki |

(Continued)

FOREIGN PATENT DOCUMENTS

| JP | 06-303562 | 10/1994 |
| JP | 2010-232911 | 10/2010 |

(Continued)

OTHER PUBLICATIONS

International Search Report to PCT/JP2014/066850 (3 pgs.).

(Continued)

*Primary Examiner* — Pritham Prabhakher
(74) *Attorney, Agent, or Firm* — John C. Pokotylo; Straub & Pokotylo

(57) ABSTRACT

An image processing device includes: a determination unit that determines, based on a plurality of pieces of image data which is generated by continuously taking images of an area of field of view and input from an imaging unit provided outside the image processing device, whether the area of field of view of the imaging unit has been changed; an image composition unit that superimposes overlapping areas of imaging regions of a plurality of images corresponding to the plurality of pieces of image data along a direction in which the area of field of view of the imaging unit has been changed, to generate composite image data when the area of field of view of the imaging unit has been changed; and a display control unit that causes a display unit provided outside the imaging processing device to display a composite image corresponding to the generated composite image data.

10 Claims, 21 Drawing Sheets

(56) References Cited

U.S. PATENT DOCUMENTS

| | | |
|---|---|---|
| 8,736,664 B1 * | 5/2014 | Gruenig .......................... 348/36 |
| 8,848,032 B2 | 9/2014 | Yamaji |
| 8,866,879 B2 * | 10/2014 | Seen et al. ...................... 348/38 |
| 2007/0025723 A1 * | 2/2007 | Baudisch et al. ............. 396/287 |
| 2009/0022422 A1 * | 1/2009 | Sorek et al. ................... 382/284 |
| 2011/0304697 A1 * | 12/2011 | Kim et al. ....................... 348/47 |
| 2012/0011464 A1 * | 1/2012 | Hayashi et al. ............... 715/784 |
| 2012/0075412 A1 | 3/2012 | Miyamoto |
| 2012/0113216 A1 * | 5/2012 | Seen et al. ...................... 348/38 |
| 2012/0120187 A1 * | 5/2012 | Goto et al. ...................... 348/36 |
| 2012/0120188 A1 * | 5/2012 | Arai et al. ....................... 348/36 |
| 2013/0250047 A1 * | 9/2013 | Hollinger ........................ 348/36 |
| 2015/0022674 A1 * | 1/2015 | Blair et al. .................. 348/207.1 |

FOREIGN PATENT DOCUMENTS

| | | |
|---|---|---|
| JP | 2011-217065 | 10/2011 |
| JP | 2012-070241 | 4/2012 |

OTHER PUBLICATIONS

Written Opinion to PCT/JP2014/006850 (3 pgs.) with translation (3 pgs.).

* cited by examiner

IMAGE PROCESSING DEVICE, DISPLAY DEVICE, IMAGE PROCESSING METHOD, AND COMPUTER-READABLE RECORDING MEDIUM FOR GENERATING COMPOSITE IMAGE DATA

CROSS REFERENCES TO RELATED APPLICATIONS

This application is a continuation of PCT international application Ser. No. PCT/JP2014/066850 filed on Jun. 25, 2014 which designates the United States, incorporated herein by reference, and which claims the benefit of priority from Japanese Patent Application No. 2013-208570, filed on Oct. 3, 2013, incorporated herein by reference.

BACKGROUND

1. Technical Field

The disclosure relates to an image processing device for generating image data, a display device for displaying an image corresponding to the image data, an image processing method, and a computer-readable recording medium.

2. Related Art

Recently, a technique has been known which prevents camera shake while a user pans an imaging device such as a digital video camera when shooting a moving image (see Japanese Patent Application Laid-open No. 2010-232911).

SUMMARY

In accordance with some embodiments, an image processing device for generating image data, a display device for displaying an image corresponding to the image data, an image processing method, and a computer-readable recording medium are presented.

In some embodiments, an image processing device includes: a determination unit configured to determine, based on a plurality of pieces of image data which is generated by continuously taking images of a specified area of field of view and input from an imaging unit provided outside the image processing device, whether the area of field of view of the imaging unit has been changed; an image composition unit configured to superimpose overlapping areas of imaging regions of a plurality of images corresponding to the plurality of pieces of image data along a direction in which the area of field of view of the imaging unit has been changed, to generate composite image data when the determination unit determines that the area of field of view of the imaging unit has been changed; and a display control unit configured to cause a display unit provided outside the imaging processing device to display a composite image corresponding to the composite image data generated by the image composition unit. When the determination unit determines that the area of field of view of the imaging unit has not been changed after the composite image data is generated, the image composition unit combines images corresponding to the plurality of pieces of image data generated by the imaging unit immediately after determination by the determination unit, in a latest image area corresponding to a latest plurality of pieces of image data which is combined into the composite image data, to update the composite image data.

In some embodiments, a display device includes the image processing device, the imaging unit, and the display unit.

In some embodiments, an image processing method executed by an image processing device includes: determining, based on a plurality of pieces of image data which is generated by continuously taking images of a specified area of field of view and input from an imaging unit provided outside the image processing device, whether the area of field of view of the imaging unit has been changed; superimposing overlapping areas of imaging regions of a plurality of images corresponding to the plurality of pieces of image data along a direction in which the area of field of view of the imaging unit has been changed, to generate composite image data when it is determined that the area of field of view of the imaging unit has been changed; and causing a display unit provided outside the imaging processing device to display a composite image corresponding to the composite image data. When it is determined that the area of field of view of the imaging unit has not been changed after the composite image data is generated, images corresponding to the plurality of pieces of image data generated by the imaging unit immediately after determination are combined in a latest image area corresponding to a latest plurality of pieces of image data which is combined into the composite image data, to update the composite image data.

In some embodiments, a non-transitory computer-readable recording medium is a recording medium with an executable program stored thereon. The program instructs an image processing device to perform: determining, based on a plurality of pieces of image data which is generated by continuously taking images of a specified area of field of view and input from an imaging unit provided outside the image processing device, whether the area of field of view of the imaging unit has been changed; superimposing overlapping areas of imaging regions of a plurality of images corresponding to the plurality of pieces of image data along a direction in which the area of field of view of the imaging unit has been changed, to generate composite image data when it is determined that the area of field of view of the imaging unit has been changed; and causing a display unit provided outside the imaging processing device to display a composite image corresponding to the composite image data. When it is determined that the area of field of view of the imaging unit has not been changed after the composite image data is generated, images corresponding to the plurality of pieces of image data generated by the imaging unit immediately after determination are combined in a latest image area corresponding to a latest plurality of pieces of image data which is combined into the composite image data, to update the composite image data.

The above and other features, advantages and technical and industrial significance of this invention will be better understood by reading the following detailed description of presently preferred embodiments of the invention, when considered in connection with the accompanying drawings.

DETAILED DESCRIPTION

Modes for carrying out the present invention (hereinafter referred to as "embodiments") will be described below with reference to the drawings. Further, an imaging device including an image processing device and a display device will be described below as an example. The present invention is not limited to the following embodiments. The same reference signs are used to refer to the same elements throughout the drawings.

First Embodiment

Figure 1:
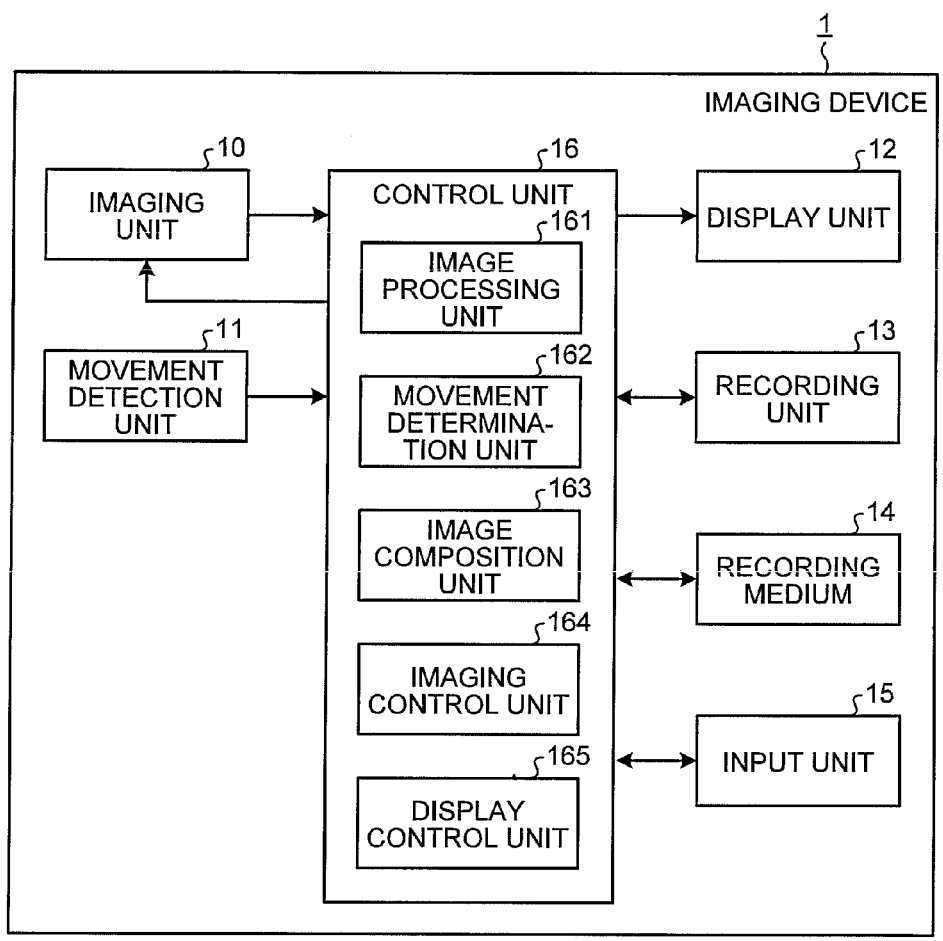
FIG. 1 is a block diagram illustrating a functional configuration of an imaging device according to the present invention.

FIG. 1 is a block diagram illustrating a functional configuration of an imaging device according to the present invention. The imaging device 1 of FIG. 1 includes an imaging unit 10, a movement detection unit 11, a display unit 12, a recording unit 13, a recording medium 14, an input unit 15, and a control unit 16.

Under the control of the control unit 16, the imaging unit 10 continuously images a specified area of field of view, and generates a plurality of pieces of sequential image data (moving image data). The imaging unit 10 includes an optical system, a diaphragm, an imaae sensor, a shutter, a signal processing unit, an A/D converter, and a timing generator. The optical system has a plurality of lenses, and forms an object image. The diaphragm adjusts the light intensity of the optical system. The image sensor, such as a charge coupled device (CCD) or a complementary metal oxide semiconductor (CMOS), receives the object image having been formed by the optical system, and performs photoelectric conversion to thereby generate image data. The shutter sets an exposure state or shielding state of the image sensor. The signal processing unit performs specified analog processing on the image data generated by the image sensor. The A/D converter AD-converts the analog image data input from the signal processing unit to generate digital image data, and outputs the digital image data to the control unit 16. The timing generator generates imaging timing of the image sensor.

The movement detection unit 11 detects movement on the imaging device 1, and outputs the detection result, as movement information, to the control unit 16. Specifically, the movement detection unit 11 detects acceleration and an angular velocity on the imaging device 1, and outputs the detection result, as movement information, to the control unit 16. The movement detection unit 11 includes an acceleration sensor, a gyroscope sensor, and the like.

The display unit 12 displays an image corresponding to the image data generated by the imaging unit 10, under the control of the control unit 16. In such a configuration, the image display includes rec view display, playback display, and live view display. In the rec view display, image data that has been just shot is displayed for a specified time period (e.g. three seconds). In the playback display, image data having been recorded in the recording medium 14 is played back. In the live view display, live view images are displayed time-sequentially corresponding to the image data continuously generated by the imaging unit 10. The display unit 12 includes a liquid crystal or organic electro luminescence (EL) display panel, and a driver. The display unit 12 appropriately displays operation information and shooting information of the imaging device 1.

The recording unit 13 records image data input through the control unit 16, processing information of the imaging device 1, various programs for operation of the imaging device 1, a program according to the first embodiment, various data used during execution of the program, or the like. The recording unit 13 includes a synchronous dynamic random access memory (SDRAM), a flash memory, or the like.

The recording medium 14 records image data input through the control unit 16. The recording medium 14 includes a memory card inserted from outside the imaging device 1, and is removably inserted into the imaging device 1 through a memory I/F (not illustrated). The recording medium 14 records therein image data or moving image data subjected to processing by the control unit 16. Image data or moving image data having been recorded are read from the recording medium 14 by the control unit 16.

The input unit 15 receives input of instruction signals for instructing various operations of the imaging device 1. The input unit 15 includes a power switch, a release switch, a moving image switch, and the like. The power switch switches on and off the power of the imaging device 1. The release switch receives input of a release signal for instructing the imaging device 1 to shoot a still image. The moving image switch receives input of an instruction signal for instructing the imaging device 1 to shoot a moving image.

For example, the control unit 16 transfers instructions or data corresponding to each unit of the imaging device 1 to integrally control operation of the imaging device 1. The control unit 16 includes a central processing unit (CPU). It is noted that, in the first embodiment, the control unit 16 functions as an image processing device.

A detailed configuration of the control unit 16 will be described now. The control unit 16 has an image processing unit 161, a movement determination unit 162, an image composition unit 163, an imaging control unit 164, and a display control unit 165.

The image processing unit 161 performs various image processing on the image data input from the imaging unit 10, and outputs the processed image data to the recording unit 13. Specifically, the image processing unit 161 performs image processing including optical black subtraction, white balance (WB) control, color matrix calculation, gamma correction, color reproduction, and edge enhancement. For example, the image processing unit 161 performs image processing based on preset image processing parameters. It is noted that the image processing parameters represent values of contrast, sharpness, saturation, white balance, and gradation. The image processing unit 161 compresses the image data subjected to the image processing according to a specified format, and records the compressed image data in the recording medium 14. It is noted that the specified format includes a joint photographic experts group (JPEG) format, a Motion JPEG format, and an MP4 (H.264) format. The image processing unit 161 obtains the image data (compressed image data) recorded in the recording medium 14, decompresses (extends) the obtained image data, and outputs the image data to the recording unit 13.

The movement determination unit 162 determines whether the area of field of view of the imaging unit 10 has been changed or not. Specifically, the movement determination unit 162 determines, based on the movement information input from the movement detection unit 11, whether the imaging device 1 is moved (change of the area of field of view of the imaging unit 10). For example, when the imaging device 1 is panned or tilted by the user, the movement determination unit 162 determines, based on change of the movement information input from the movement detection unit 11, whether the imaging device 1 moves horizontally or vertically. It is noted that, in the first embodiment, the movement determination unit 162 functions as a determination unit.

When it is determined by the movement determination unit 162 that the area of field of view of the imaging unit 10 has been changed, the image composition unit 163 generates composite image data obtained by superimposing overlapping areas of imaging regions of a plurality of images corresponding to a plurality of pieces of image data generated by the imaging unit 10 along a direction in which the area of field of view of the imaging unit 10 has been changed. For example, the image composition unit 163 combines two pieces of image data in which two temporally preceding and subsequent images have right and left ends overlapping on each other, respectively, and generates the composite image data.

When a release signal is input from the input unit 15, the imaging control unit 164 controls the imaging device 1 to start shooting operation. It is noted that the shooting operation in the imaging device 1 represents specified image processing operation by the image processing unit 161 for the image data generated by the imaging unit 10 (development). Under the control of the imaging control unit 164, the image data processed in this way is compressed at the image processing unit 161 and recorded in the recording medium 14. When the instruction signal for instructing to shoot a moving image is input from the input unit 15, the imaging control unit 164 generates a moving image file in the recording medium 14, and sequentially records (stores) the moving image data in the moving image file. In such a configuration, the moving image data is obtained in such a manner that the image processing unit 161 subjects the image data sequentially generated by the imaging unit 10 to the specified image processing.

The display control unit 165 displays an image corresponding to the image data on the display unit 12. Specifically, the display control unit 165 displays, on the display unit 12, the live view image corresponding to image data subjected to the image processing by the image processing unit 161 or the composite image corresponding to the composite image data generated by the image composition unit 163. When the movement determination unit 162 determines that an area of field of view of the imaging unit 10 has been changed, the display control unit 165 displays, on the display unit 12, images corresponding to respective image data generated before and after the change of the area of field of view of the imaging unit 10, along a direction in which the area of field of view of the imaging unit 10 has been changed.

Figure 2:
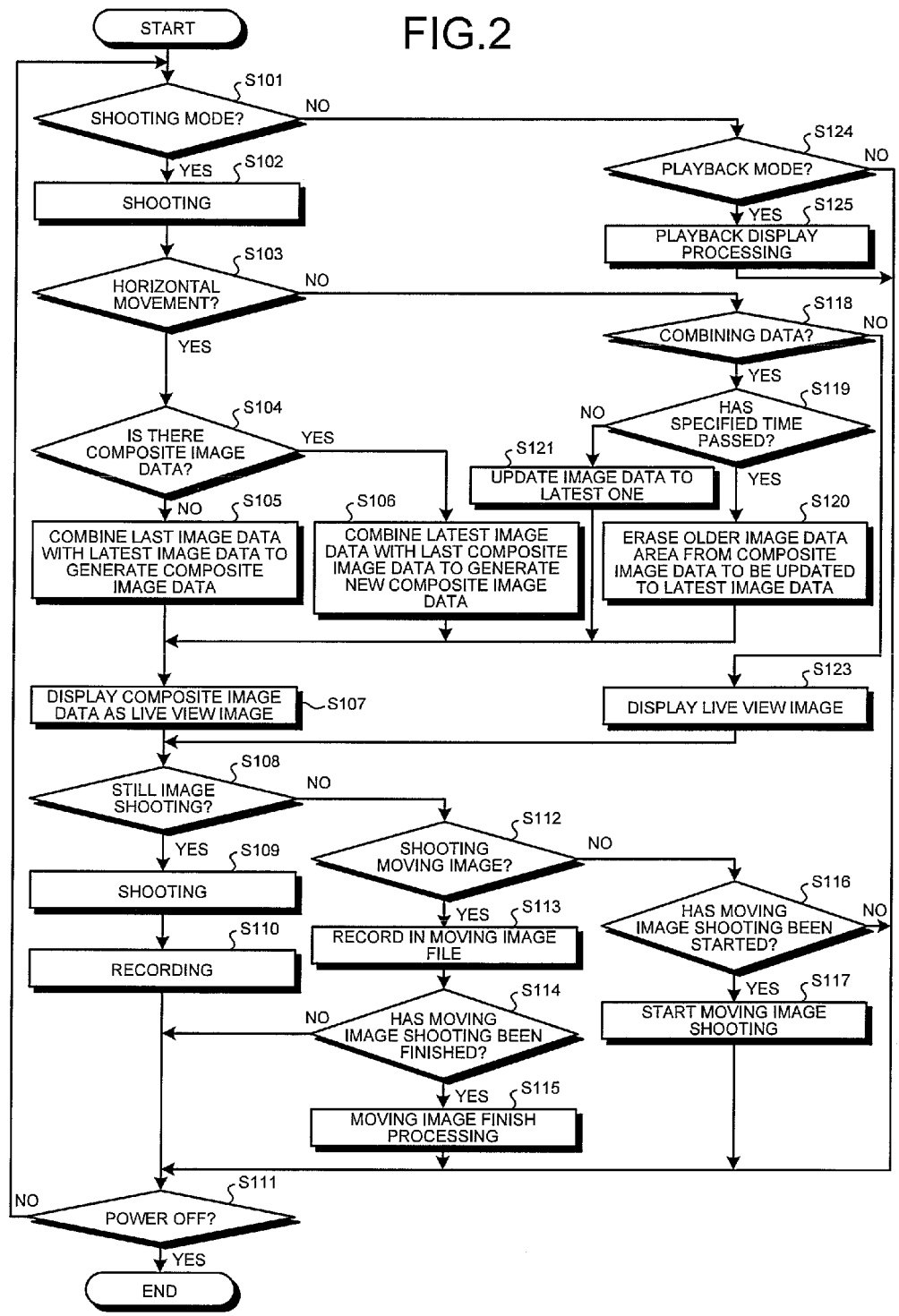
FIG. 2 is a schematic flowchart illustrating processing of the imaging device according to the present invention.

Processing performed by the imaging device 1 having the above-mentioned configuration will be described. FIG. 2 is a schematic flowchart illustrating processing of the imaging device 1.

First, as illustrated in FIG. 2, a case will be described in which the imaging device 1 is set to a shooting mode (step S101: Yes). In such a condition, the imaging control unit 164 causes the imaging unit 10 to perform the shooting (step S102).

Next, the movement determination unit 162 determines whether the imaging device 1 has been moved horizontally (step S103).

Figure 3:
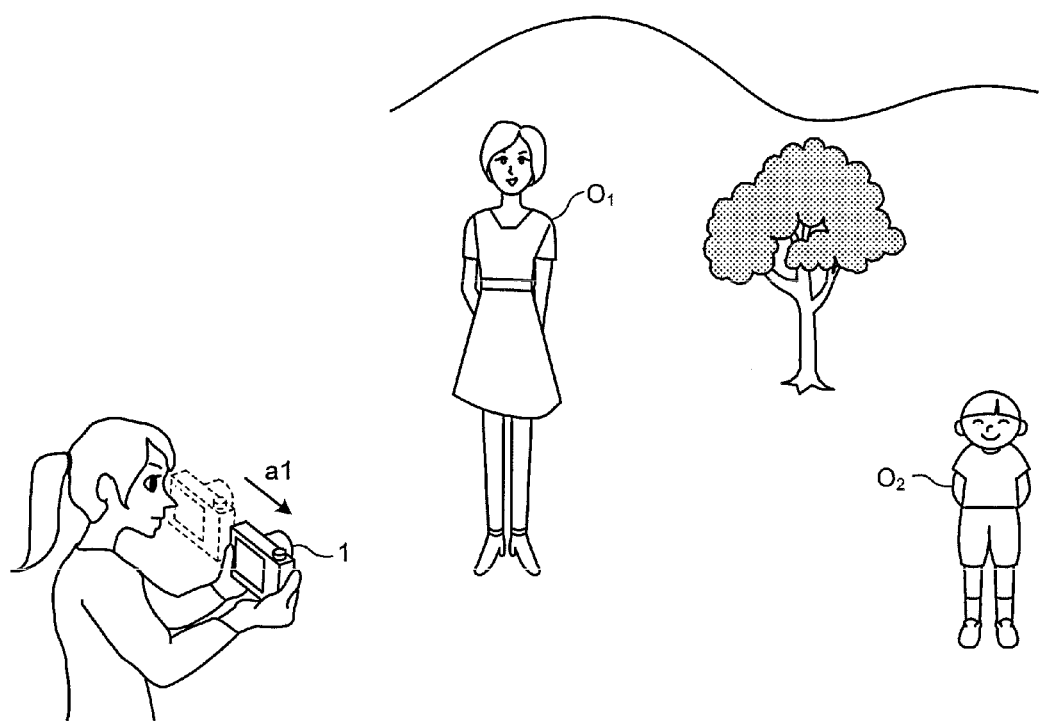
FIG. 3 is a schematic view illustrating a situation in which the imaging device according to the present invention is panned by a user.
Figure 4:
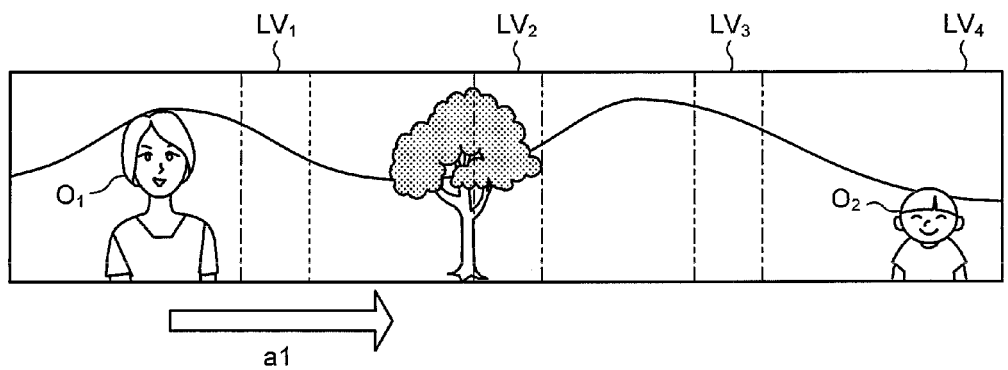
FIG. 4 is a schematic view illustrating an area of field of view which is imaged by the imaging device under the situation illustrated in FIG. 3.

FIG. 3 is a schematic view illustrating a situation in which the imaging device 1 is panned by a user. FIG. 4 is a schematic view illustrating an area of field of view which is imaged by the imaging device 1 under the situation illustrated in FIG. 3. It is noted that, FIGS. 3 and 4 illustrate a situation in which when the user pans the imaging device 1, the imaging device 1 is moved in a substantially horizontal direction (direction indicated by arrow a1), and an area of field of view including an object $O_1$ and an area of field of view including an object $O_2$ are continuously imaged. Further it is noted that, in FIG. 4, an image $LV_1$ corresponds to a first image of the area of field of view of the imaging device 1, and images $LV_2$ to $LV_4$ correspond to images of the areas of field of view taken during the moving of the imaging device 1.

As illustrated in FIGS. 3 and 4, the movement determination unit 162 determines, based on the movement information detected by the movement detection unit 11, whether the imaging device 1 has been moved in a substantially horizontal direction (panning direction), when the user pans the imaging device 1. It is noted that, in FIGS. 3 and 4, the movement determination unit 162 may determine whether the imaging device 1 has been moved in a substantially vertical direction (tilting direction) based on the movement information detected by the movement detection unit 11. When the movement determination unit 162 determines that the imaging device 1 has been moved in the horizontal direction (step S103: Yes), the imaging device 1 proceeds to step S104 which will be described below. On the other hand, when the movement determination unit 162 determines that the imaging device 1 has not been moved in the horizontal direction (step S103: No), the imaging device 1 proceeds to step 3118 which will be described below.

In step S104, the control unit 16 determines whether the recording unit 13 has composite image data. When the control unit 16 determines that the recording unit 13 has the composite image data (step S104: Yes), the imaging device 1 proceeds to step S106 which will be described below. On the other hand, when the control unit 16 determines that the recording unit 13 does not have the composite image data (step S104: No), the imaging device 1 proceeds to step S105 which will be described below.

In step S105, the image composition unit 163 generates composite image data by combining last image data recorded by the recording unit 13 and latest image data generated by the imaging unit 10.

Figure 5:
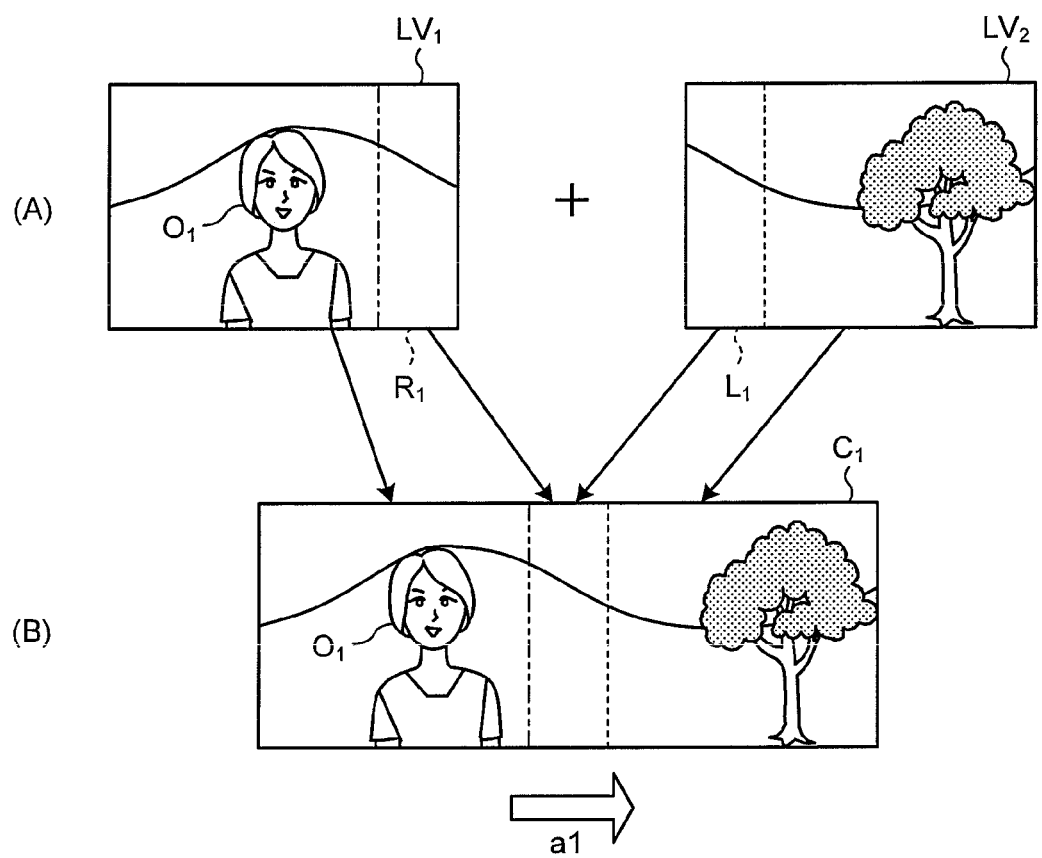
FIG. 5 is a schematic view illustrating an exemplary composite image corresponding to composite image data generated by an image composition unit of the imaging device according to the present invention.

FIG. 5 is a schematic view illustrating an exemplary composite image corresponding to composite image data generated by the image composition unit 163. FIG. 5 illustrates an exemplary composite image obtained when the imaging device 1 is moved in the horizontal direction (direction indicated by arrow a1) from the left side to the right side as seen from the photographer.

As illustrated in FIG. 5, the image composition unit 163 combines an image $LV_1$ recorded by the recording unit 13 and corresponding to last image data generated by the imaging unit 10, with an image $LV_2$ corresponding to latest image data generated by the imaging unit 10 along a moving direction of the imaging device 1 (changing direction of area of field of view of imaging unit 10) to generate a composite image $C_1$ corresponding to composite image data (in the order of (A) to (B) of FIG. 5). In such a condition, the image composition unit 163 superimposes and combines an end part $R_1$ of the image $LV_1$ and an end part $L_1$ of the image $LV_2$ so that horizontal one ends of the imaging regions (area of field of view), which overlap each other in the imaging regions, are superimposed, and generates the composite image $C_1$ corresponding to composite image data. At that time, the image composition unit 163 may determine and combine regions of the end part $R_1$ of the image $LV_1$ and the end part $L_1$ of the image $LV_2$, respectively, based on pixel consistency between the images $LV_1$ and $LV_2$. It is noted that, in FIG. 5, the regions of the end part $R_1$ of the image $LV_1$ and the end part $L_1$ of the image $LV_2$ do not need to be equal, the image composition unit 163 preferably combines the two images $LV_1$ and $LV_2$, and the areas of the end part $R_1$ of the image $LV_1$ and the end part $L_1$ of the image $LV_2$ may be appropriately changed, for example, by a frame rate.

In step S106, the image composition unit 163 generates new composite image data obtained by combining latest image data generated by the imaging unit 10 with last composite image data generated by the image composition unit 163 and recorded by the recording unit 13.

Figure 6:
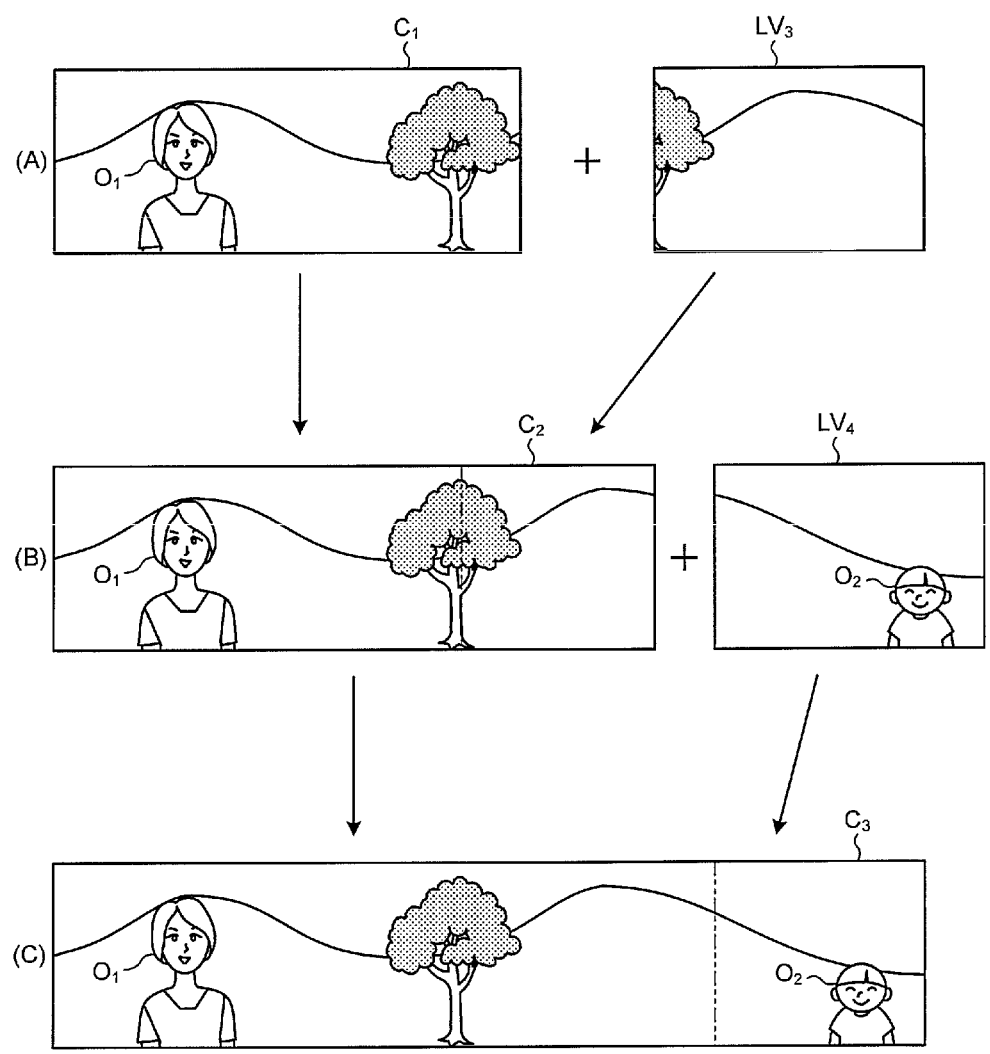
FIG. 6 is a schematic view illustrating an exemplary composite image corresponding to composite image data generated by combining latest image data with last composite image data by the image composition unit of the imaging device according to the present invention.

FIG. 6 is a schematic view illustrating an exemplary composite image corresponding to composite image data generated in such a manner that the image composition unit 163 combines latest image data with last composite image data. FIG. 6 illustrates an exemplary composite image obtained when the imaging device 1 is moved in the horizontal direction from the left side to the right side as seen from the photographer.

As illustrated in FIG. 6, the image composition unit 163 combines an image $LV_3$ corresponding to latest image data generated by the imaging unit 10 with the composite image $C_1$ corresponding to last composite image data recorded by the recording unit 13 to generate a composite image $C_2$ corresponding to composite image data (in the order of (A) to (B) of FIG. 6). In such a condition, the image composition unit 163 superimposes and combines an end part of the composite image $C_1$ and an end part of the image $LV_3$ so that horizontal one ends of overlapping nn each other in the imaging regions, are superimposed, and generates the composite image $C_2$ corresponding to the composite image data. At that time, the image composition unit 163 determines and combines, based on the pixel consistency between the composite image $C_1$ and the image $LV_3$, areas at the end of the composite image $C_1$ and the end of the image $LV_3$. Further, with the movement of the imaging device 1, the image composition unit 163 time-sequentially combines an image $LV_4$ corresponding to latest image data continuously generated by the imaging unit 10, with the composite image, and generates a composite image $C_3$ corresponding to composite image data (in the order of (A), (B), and (C) of FIG. 6). It is noted that, in FIG. 6, the respective areas of the end part of the composite image and the end part of the image do not need to be equal, as long as the image composition unit 163 can combine the latest image with the composite image, and the respective areas can be appropriately changed based on the pixel consistency between the mutually overlapping areas.

Next, the display control unit 165 displays, on the display unit 12, a composite image corresponding to the composite image data generated by the image composition unit 163 (step S107). For example, as illustrated in (B) of FIG. 5, the display control unit 165 displays, on the display unit 12, the composite image $C_1$ corresponding to the composite image data generated by the image composition unit 163. In such a configuration, the display control unit 165 reduces the size of, or changes an aspect ratio of the composite image $C_1$ so as to display the image in a display area of the display unit 12, and displays the composite image $C_1$ on the display unit 12. At that time, the display control unit 165 may display, on the display unit 12, information on the moving direction of the imaging device 1 (changing direction of area of field of view of imaging device 1). Specifically, as illustrated in (B) of FIG. 5, the display control unit 165 displays, on the display unit 12, the arrow a1 as information on the moving direction of the imaging device 1. It is noted that two images illustrated in (B) of FIG. 5 may be overlapped, displayed, and overwritten, without being combined. It is difficult, during panning, to confirm whether the images are exactly connected without a seam, and exact image composition is not required. The combining includes overwriting of the overlapped areas.

Therefore, the user can intuitively grasp the moving direction of the imaging device 1 to play back and confirm the moving image. Further, when the user plays back and visually confirms the shot moving image, even if the movement of the imaging device 1 changes the area of field of view, the image is gradually displayed along the moving direction of the imaging device 1 (e.g. in the order of composite image $C_1$ of FIG. 6, (A), composite image $C_2$ of FIG. 6, (B), and further to composite image $C_3$ of FIG. 6, (C)). Therefore, the area of field of view of the imaging device 1 is not suddenly changed, and miscellaneous objects are not displayed, so that comfortable visibility is allowed. Further, even if the area of field of view is changed due to the movement of the imaging device 1, the image is gradually displayed along the moving direction of the imaging device 1 (changing direction of area of field of view of imaging unit 10), so that the user can catch up with the display to look and confirm it, and the image allows comfortable visibility without flickering.

After step S107, when an instruction signal for instructing to shoot a still image is input from the input unit 15 (step S108: Yes), the imaging control unit 164 causes the imaging device 1 to perform the shooting (step S109), and records still image data generated by the imaging unit 10 in the recording medium 14 (step S110). In such a configuration, when the image composition unit 163 generates the composite image data, the imaging control unit 164 records the composite image data (e.g., composite image $C_1$ of FIG. 5, (B) or composite image $C_3$ of FIG. 6, (C)), as the still image data, in the recording medium 14. At that time, the imaging control unit 164 may store the still image data and the composite image data in one image file to be recorded in the recording medium 14.

Next, when power of the imaging device 1 is turned off through the input unit 15 (step S111: Yes), the imaging device 1 finishes this processing. On the other hand, when power of the imaging device 1 is not turned off through the input unit 15 (step S111: No), the imaging device 1 returns to step S101.

In step S108, when the instruction signal for instructing to shoot a still image is not input from the input unit 15 (step S108: No), the imaging control unit 164 records the image data generated by the imaging unit 10 in the moving image file of the recording medium 14 (step S113) while the imaging device 1 shoots a moving image (step S112: Yes). In such a configuration, when the image composition unit 163 generates the composite image data, the imaging control unit 164 records, in substitution for the image data, composite image data (e.g., composite image $C_1$ of FIG. 6, (A) or composite image $C_3$ of FIG. 6, (C)) in a moving image file of the recording medium 14. At that time, the imaging control unit 164 may record the image data generated by the imaging unit 10, as still image data, in the moving image file.

Next, when an instruction signal for finishing shooting a moving image is input from the input unit 15 (step S114: Yes), the imaging control unit 164 performs moving image finish processing for writing specified information such as presence/absence of composition, a time of shooting a moving image, and a compression method, into header information of the moving image file generated in the recording medium 14 (step S115). After step S115, the imaging device 1 proceeds to step S111. On the other hand, when the instruction signal for finishing shooting a moving image is not input from the input unit 15 (step S114: No), the imaging device 1 proceeds to step S111.

In step S108, when the instruction signal for instructing to shoot a still image is not input from the input unit 15 (step S108: No), the imaging device 1 proceeds to step S116, while the imaging device 1 is not shooting the moving image (step S112: No).

Next, when an instruction signal for instructing to start shooting a moving image is input from the input unit 15 (step S116: Yes), the imaging control unit 164 starts shooting a moving image by the imaging device 1 (step S117). At that time, the imaging control unit 164 generates a moving image file in the recording medium 14. Image data sequentially generated by the imaging unit 10 is recorded, as moving image data, time-sequentially in the moving image file. After step S117, the imaging device 1 proceeds to step S111. On the other hand, when the instruction signal for instructing to start shooting a moving image is not input from the input unit 15 (step S116: No), the imaging device 1 proceeds to step S111.

During composition by the image composition unit 163 in step S118 (step S118: Yes), when a time period for displaying a composite image on the display unit 12 exceeds a specified time period, for example five seconds (step S119: Yes), the image composition unit 163 erases an image area corresponding to the oldest image data (first image data) from the composite image data displayed on the display unit 12, and updates an image area, corresponding to the last image data combined with the composite image data, to an image corresponding to the latest image data (step S120). After step S120, the imaging device 1 proceeds to step S107.

Figure 7:
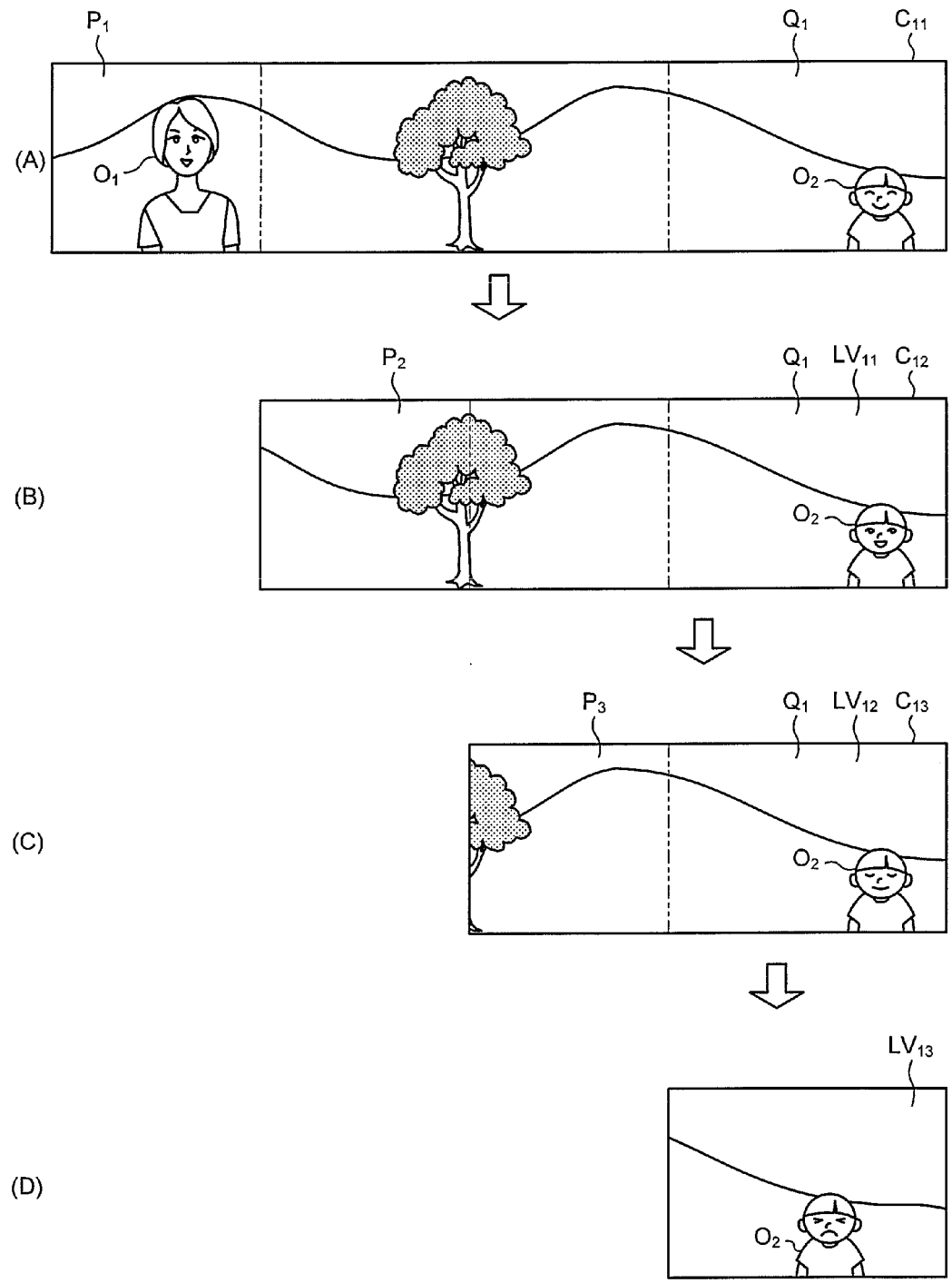
FIG. 7 is a schematic view illustrating an exemplary composite image corresponding to composite image data generated by the image composition unit when the user stops the panning of the imaging device.

FIG. 7 is a schematic view illustrating an exemplary composite image corresponding to composite image data generated by the image composition unit 163 when the user stops the panning of the imaging device 1. In FIG. 7, the right side of FIG. 7 has a latest composition time relative to the left side.

As illustrated in FIG. 7, the image composition unit 163 erases an oldest image data area $P_1$ from a composite image $C_n$ displayed on the display unit 12, and updates an area $Q_1$, corresponding to latest image data combined with the composite image $C_{11}$, to an image $LV_{11}$ corresponding to the latest image data (in the order of (A) to (B) of FIG. 7). Then, when a time period for displaying a composite image $C_{12}$ on the display unit 12 exceeds a specified time, the image composition unit 163 erases an oldest image data area $P_2$ from the composite image $C_{12}$ displayed on the display unit 12, and updates the area $Q_1$, corresponding to the latest image data combined with the composite image $C_{12}$, to an image $LV_{12}$ corresponding to latest image data (in the order of (B) to (C) of FIG. 7). Next, when a time period for displaying a composite image $C_{13}$ on the display unit 12 exceeds a specified time, the image composition unit 163 erases an oldest image data area $P_3$ from the composite image $C_{13}$ displayed on the display unit 12, and updates the area $Q_1$, corresponding to the latest image data combined with the composite image $C_{13}$, to an image $LV_{13}$ corresponding to latest image data (in the order of (C) to (D) of FIG. 7). As described above, when the imaging device 1 stops moving in the horizontal direction, a displayed area of the composite image corresponding to the composite image data is gradually reduced with elapse of time, and a normal live view image is displayed or a moving image is played back and displayed (in the order of (A), (B), (C), and (D) of FIG. 7). Consequently, when the moving image file is played back, the user can intuitively understand that the photographer has finished panning, and the displayed area is smoothly shifted, so that the moving image allows comfortable visibility.

During composition by the image composition unit 163 in step S118 (step S118: Yes), when the time period for displaying a composite image on the display unit 12 does not exceed a specified time period, for example five seconds (step S119: No), the image composition unit 163 updates an image area, corresponding to the last image data combined with the composite image displayed on the display unit 12, to an image corresponding to the latest image data (step S121). After step S121, the imaging device 1 proceeds to step S107.

Figure 8:
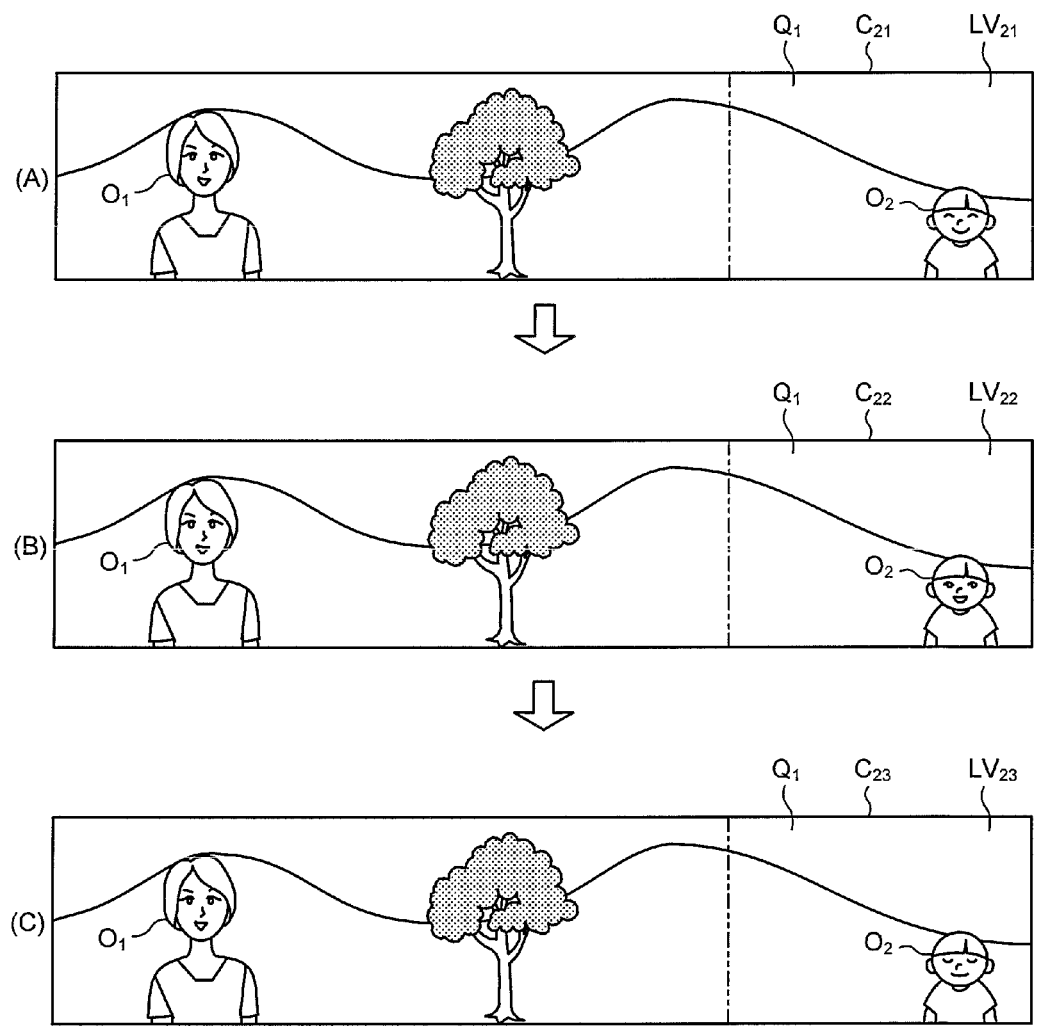
FIG. 8 is a schematic view illustrating an exemplary composite image corresponding to composite image data generated by the image composition unit, before elapse of a specified time period for displaying a composite image displayed on a display unit of the imaging device according to the present invention.

FIG. 8 is a schematic view illustrating an exemplary composite image corresponding to composite image data generated by the image composition unit 163 when time for displaying a composite image on the display unit 12 does not exceed a specified time period.

As illustrated in FIG. 8, the image composition unit 163 combines an image $LV_{22}$ corresponding to latest image data generated by the imaging unit 10 with an area $Q_1$ of an image $LV_{21}$ corresponding to last image data combined with a composite image $C_{21}$ displayed on the display unit 12. As a result, the image is updated to a composite image $C_{22}$ corresponding to the composite image data (in the order of (A) to (B) of FIG. 8). Then, the image composition unit 163 combines an image $LV_{23}$ corresponding to latest image data generated by the imaging unit 10 with an area $Q_1$ of the image $LV_{22}$ corresponding to last image data combined with the composite image $C_{22}$ displayed on the display unit 12. As a result, the image is updated to a composite image $C_{23}$ corresponding to the composite image data (in the order of (B) to (C) of FIG. 8). Therefore, when the imaging device 1 stops moving in the horizontal direction, a composite image updated to an image corresponding to latest image data generated by the imaging unit 10 is displayed as a live view image, while the time period for displaying a composite image on the display unit 12 does not exceed a specified time period. Consequently, the user can understand a state of the object changed in real time, together with an ambient environment.

During a time other than the composition by the image composition unit 163 in step S118 (step S118: No), the display control unit 165 displays, on the display unit 12, the live view image corresponding to the image data generated by the imaging unit 10 (step S123). After step S120, the imaging device 1 proceeds to step S108.

While the imaging device 1 is not set to the shooting mode in step S101 (step S101: No), when the imaging device 1 is set to a playback mode (step S124: Yes), the imaging device 1 performs playback display processing for playback display of still image data or moving image file recorded in the recording medium 14 on the display unit 12 (step S125). In such a configuration, when the moving image data of the moving image file is played back and displayed, the composite image is displayed as illustrated in FIGS. 6, 7, and 8 even if panning or tilting is performed while shooting a moving image, and comfortable visibility is provided for users. After step S125, the imaging device 1 proceeds to step S111. On the other hand, when the playback mode is not set to the imaging device 1 (step S124: No), the imaging device 1 proceeds to step S111.

As described above, according to the first embodiment of the present invention, when the movement determination unit 162 determines that the area of field of view of the imaging unit 10 has been changed, the display control unit 165 displays, as a live view image on the display unit 12, a composite image corresponding to composite image data generated by the image composition unit 163. Therefore, even if an area of field of view is suddenly changed during shooting of a moving image, comfortable visibility is provided for users.

According to the first embodiment of the present invention, the display control unit 165 reduces the size of a composite image corresponding to composite image data generated by the image composition unit 163, and displays the composite image on the display unit 12. Therefore, even if the composite image generated by the image composition unit 163 has a large displayed area, the composite image can be fully displayed.

According to the first embodiment of the present invention, until the movement determination unit 162 determines that the area of field of view of the imaging unit 10 has not been changed, the image composition unit 163 generates composite image data obtained by superimposing overlapping areas in imaging regions of a plurality of images along a changing direction in which the area of field of view of the imaging unit 10 has been changed. Therefore, even if the area of field of view is suddenly changed during shooting of a moving image, comfortable visibility is provided for users, and the users can intuitively understand a panning direction during shooting of the moving image.

According to the first embodiment of the present invention, when the movement determination unit 162 determines that an area of field of view of the imaging unit 10 has not been changed after the image composition unit 163 generates composite image data, the image composition unit 163 combines a latest image corresponding to latest image data generated by the imaging unit 10 with a last image area corresponding to last image data combined with a composite image, and updates the composite image. Accordingly, even if the area of field of view is suddenly changed while shooting a moving image, an image is not interrupted, and a current image corresponding to an area of field of view of the imaging unit 10 is updated to be displayed on the display unit 12. Therefore, a desired object can be visually confirmed in real time.

According to the first embodiment of the present invention, when the movement determination unit 162 determines that the area of field of view of the imaging unit 10 has not been changed, the display control unit 165 gradually eliminates an area of the composite image corresponding to older image data among a plurality of pieces of image data combined by the image composition unit 163 with elapse of time, and displays the composite image on the display unit 12. Therefore, even if the movement of the imaging device 1 is stopped, a displayed area of the image can be smoothly shifted while being reduced, and comfortable visibility is provided for users.

It is noted that the first embodiment of the present invention has been applied to the panning of the imaging device 1 by the user, but can be applied to tilting of the imaging device 1 by the user. In the tilting operation, the movement determination unit 162 preferably determines, based on acceleration input from the movement detection unit 11, whether the imaging device 1 has moved substantially vertically.

Second Embodiment

A second embodiment of the present invention will be described below. An imaging device according to the second embodiment of the present invention has a configuration and processing which are different from those of the imaging device 1 according to the first embodiment described above. The configuration of the imaging device according to the second embodiment will be described below, after which the processing performed by the imaging device according to the second embodiment will be described. It is noted that the same reference signs will be used to refer to elements similar to those of the imaging device 1 according to the first embodiment, and description thereof will be omitted.

Figure 9:
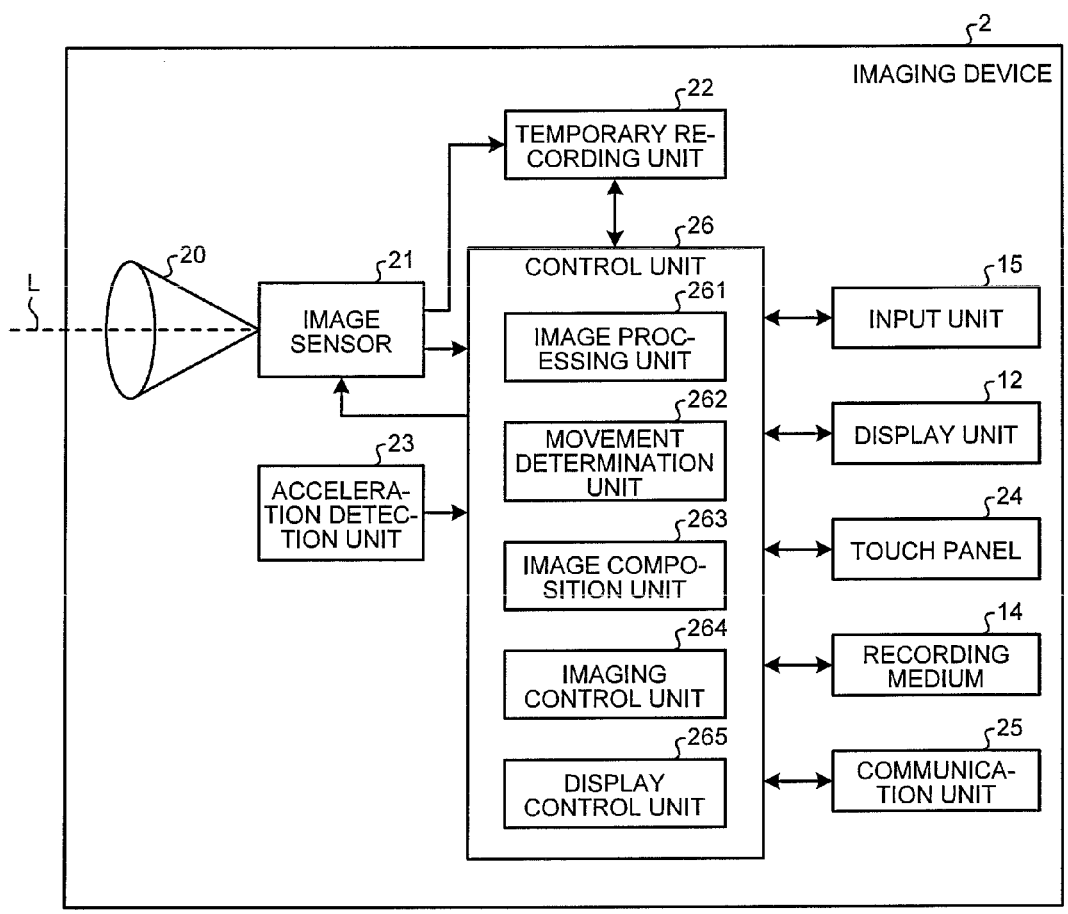
FIG. 9 is a block diagram illustrating a functional configuration of an imaging device according to a second embodiment of the present invention.

FIG. 9 is a block diagram illustrating a functional configuration of the imaging device according to the second embodiment. As illustrated in FIG. 9, the imaging device 2 includes a display unit 12, a recording medium 14, an input unit 15, a lens portion 20, an image sensor 21, a temporary recording unit 22, an acceleration detection unit 23, a touch panel 24, a communication unit 25, and a control unit 26.

The lens portion 20 collects light from a specified area of field of view to form an object image on the image sensor 21. The lens portion 20 includes a zoom lens or a focus lens which are movable along an optical axis L, and a diaphragm.

The image sensor 21 receives an object image formed by the lens portion 20, performs photoelectric conversion, and generates image data. The image sensor 21 includes a CCD or CMOS, a shutter, a signal processing unit, an A/D converter, and the like. It is noted that, in the second embodiment, the lens portion 20 and the image sensor 21 function as an imaging unit.

The temporary recording unit 22 records image data generated by the image sensor 21, information being processed by the imaging device 2, various programs for operation of the imaging device 2, a program according to the second embodiment, and the like. The temporary recording unit 22 includes an SDRAM, a flash memory, or the like.

The acceleration detection unit 23 detects acceleration and an angular velocity of the imaging device 2, and outputs the detection result to the control unit 26. The acceleration detection unit 23 includes an acceleration sensor, a gyroscope sensor, and the like.

The touch panel 24 is provided to be superimposed on a display screen of the display unit 12. The touch panel 24 detects touch of an object from outside, and outputs a position signal according to a detected touch position to the control unit 26. Further, the touch panel 24 may detect a position which a user has touched based on information, for example an icon or a thumbnail, displayed on the display unit 12, and receive the input of an instruction signal for instructing the operation of the imaging device 2 or the input of a selection signal for selecting an image according to the detected touch position. Generally, examples of the touch panel 24 include a resistive touch panel, a capacitance touch panel, and an optical touch panel. The second embodiment can be applied to any touch panel.

The communication unit 25 wirelessly communicates with an external device according to a specified wireless communication standard, and transmits or receives an image file including image data. Examples of the specified wireless communication standard include IEEE802.11b standard and IEEE802.11n standard. The second embodiment can be applied to any wireless communication standard. The communication unit 25 includes a communication device for bidirectional communication of various types of information such as an image file or content data with an external device through a network. The communication device includes an antenna, a transmitting and receiving circuit, and the like. The antenna is for transmitting and receiving a radio signal between the communication device and another device. The transmitting and receiving circuit is for demodulation of the signal received by the antenna and modulation of the signal to be transmitted. When the imaging device 2 is activated, the communication unit 25 periodically transmits a communication signal including identification information (device ID) for notifying of the presence thereof. The communication unit 25 may be provided at a recording medium such as a memory card mounted from outside the imaging device 2. The communication unit 25 may be provided at an accessory mounted on the imaging device 2 through a hot shoe.

The control unit 26 performs transfer or the like of instructions or data corresponding to each unit of the imaging device 2 to integrally control operation of the imaging device 2. The control unit 26 includes a CPU or the like.

A detailed configuration of the control unit 26 will be described now. The control unit 26 has an image processing unit 261, a movement determination unit 262, an image composition unit 263, an imaging control unit 264, and a display control unit 265.

The image processing unit 261 subjects image data input from the image sensor 21 to various image processing, and outputs the processed image data to the temporary recording unit 22 or the recording medium 14.

The movement determination unit 262 determines the movement of the imaging device 2. Specifically, the movement determination unit 262 determines, based on acceleration input from the acceleration detection unit 23, whether the imaging device 2 is moved. For example, when the imaging device 2 is panned or tilted by the user, the movement determination unit 262 determines, based on a change in acceleration input from the acceleration detection unit 23, whether the imaging device 1 is moved horizontally or vertically. It is noted that, in the second embodiment, the movement determination unit 262 functions as a determination unit.

When the movement determination unit 262 determines that the area of field of view of the imaging device 2 has been changed, the image composition unit 263 generates composite image data obtained by superimposing overlapping areas in imaging regions of a plurality of images corresponding to a plurality of pieces of image data generated by the image sensor 21 along a changing direction of the area of field of view of the imaging device 2. For example, the image composition unit 263 combines two pieces of image data in which two temporally preceding and subsequent images have right and left ends overlapping on each other, respectively, and generates the composite image data.

When a release signal is input from the input unit 15, the imaging control unit 264 controls the imaging device 2 to start shooting operation.

The display control unit 265 displays an image corresponding to the image data on the display unit 12. Specifically, the display control unit 265 displays, on the display unit 12, the live view image corresponding to image data subjected to the image processing by the image processing unit 261 or the composite image corresponding to the composite image data generated by the image composition unit 263.

Figure 10:
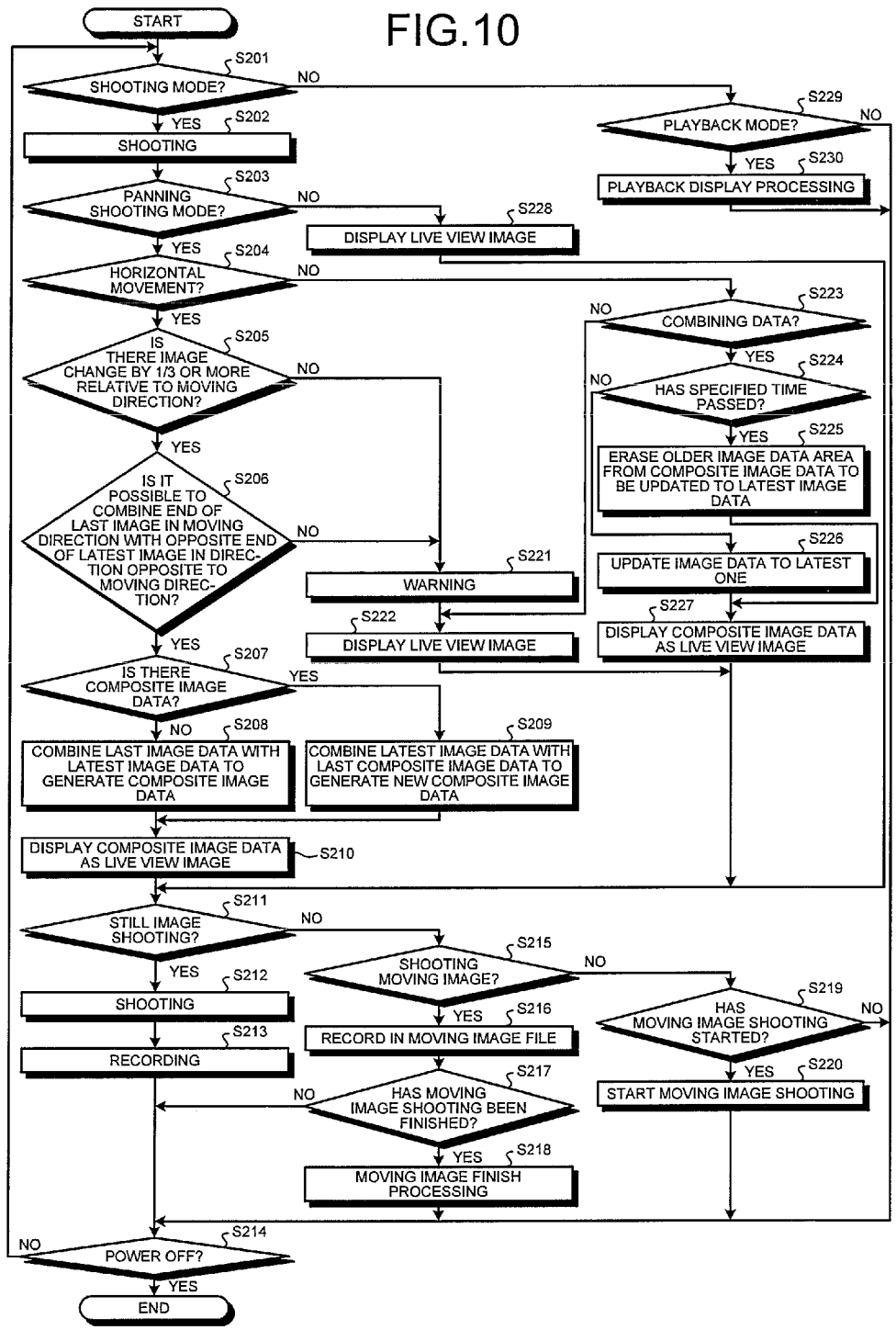
FIG. 10 is a schematic flowchart illustrating processing of the imaging device according to the second embodiment of the present invention.

Processing performed by the imaging device 2 having the above-mentioned configuration will be described. FIG. 10 is a schematic flowchart illustrating processing of the imaging device 2.

First, as illustrated in FIG. 10, the imaging device 2 being set to a shooting mode (step S201: Yes) will be described. In such a configuration, the imaging control unit 264 causes the image sensor 21 to perform the shooting (step S202).

Next, when the imaging device 2 is set to a panning shooting mode (step S203: Yes), the imaging device 2 proceeds to step S204 which will be described below. In such a condition, the imaging control unit 264 may change a high frame rate (e.g. 30 fps) of the image sensor 21 to a lower frame rate (e.g. 15 fps). On the other hand, when the imaging device 2 is not set to the panning shooting mode (step S203: No), the imaging device 2 proceeds to step S228 which will be described below.

In step S204, the movement determination unit 262 determines, based on acceleration information input from the acceleration detection unit 23, whether the area of field of view of the imaging device 2 has been moved horizontally. When the movement determination unit 262 determines that the area of field of view of the imaging device 2 has been moved horizontally (step S204: Yes), the imaging device 2 proceeds to step S205 which will be described below. On the other hand, when the movement determination unit 262 determines that the area of field of view of the imaging device 2 has not been moved horizontally (step S204: No), the imaging device 2 proceeds to step S223 which will be described below.

In step S205, the movement determination unit 262 determines whether the movement of the imaging device 2 causes image change by one-third or more relative to a moving direction of the image corresponding to image data generated by the image sensor 21. Specifically, immediately before the imaging device 2 is moved, the movement determination unit 262 compares an image corresponding to last image data generated by the image sensor 21 with an image corresponding to latest image data generated by the image sensor 21, and determines whether there is image change by one-third or more between the two images. When the movement determination unit 262 determines that the movement of the imaging device 2 causes image change by one-third or more relative to the moving direction of the image corresponding to image data generated by the image sensor 21 (step S205: Yes), the imaging device 2 proceeds to step S206 which will be described below. On the other hand, when the movement determination unit 262 determines that the movement of the imaging device 2 does not cause image change by one-third or more relative to the moving direction of the image corresponding to image data generated by the image sensor 21 (step S205: No), the imaging device 2 proceeds to step S221 which will be described below.

In step 206, when an end of the last image in the moving direction corresponding to the last image data recorded in the temporary recording unit 22 and an opposite end of the latest image in a direction opposite to the moving direction corresponding to the latest image data generated by the image sensor 21 can be combined (step S206: Yes), and if the temporary recording unit 22 has composite image data generated by the image composition unit 263 (step S207: Yes), the imaging device 2 proceeds to step S209 which will be described below.

In step 206, when the end of the last image in the moving direction corresponding to the last image data recorded in the temporary recording unit 22 and the opposite end of the latest image in a direction opposite to the moving direction corresponding to the latest image data generated by the image sensor 21 can be combined (step S206: Yes), and if the temporary recording unit 22 does not have composite image data generated by the image composition unit 263 (step S207: No), the imaging device 2 proceeds to step S208 which will be described below.

Steps S208 and S209 correspond to steps S105 and S106 of FIG. 2, respectively.

Figure 11:
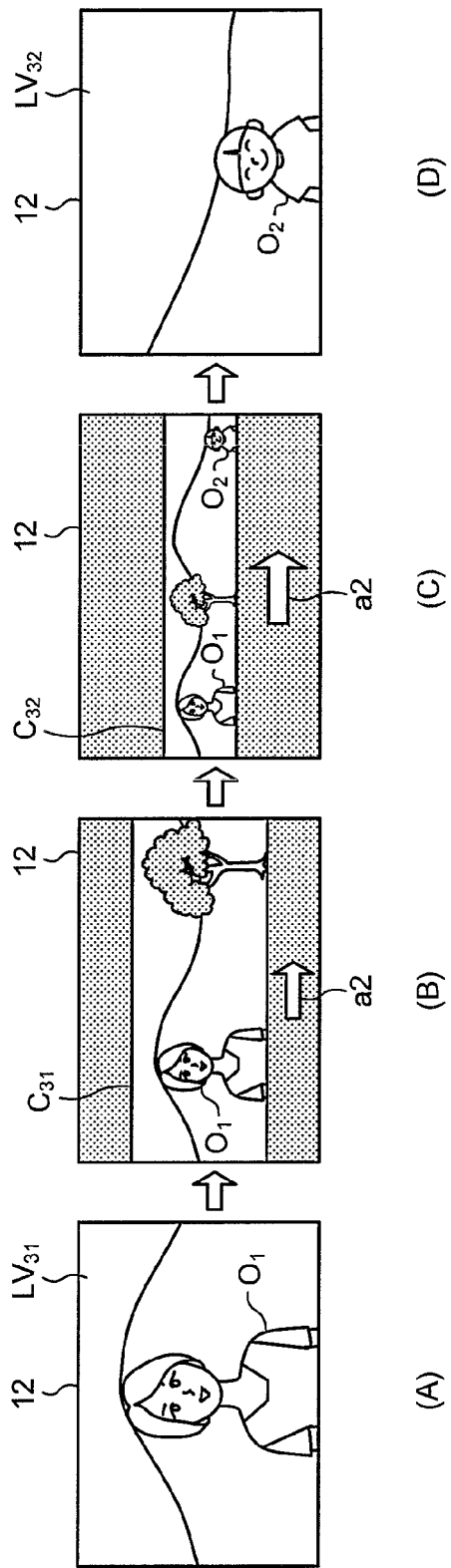
FIG. 11 is a schematic view illustrating an exemplary image displayed on a display unit of the imaging device according to the second embodiment of the present invention.

After step S208 or step S209, the display control unit 265 displays, on the display unit 12, the composite image corresponding to the composite image data generated by the image composition unit 263 (step S210). Specifically, as illustrated in FIG. 11, after the display unit 12 displays a live view image $LV_{31}$, the display control unit 265 displays a composite image $C_{31}$ corresponding to composite image data generated by the image composition unit 263 (in the order of (A) to (B) of FIG. 11). In such a condition, the display control unit 265 reduces the size of, or changes the aspect ratio of the composite image $C_{31}$ so as to display the image in a display area of the display unit 12, and displays the composite image $C_{31}$ on the display unit 12 At that time, the display control unit 265 displays, on the display unit 12, information on the moving direction of the imaging device 2. Specifically, as illustrated in (B) of FIG. 11, the display control unit 265 displays, on the display unit 12, an arrow a2 as information on the moving direction of the imaging device 2. Further, after the display unit 12 displays the composite image $C_{31}$, the display control unit 265 displays a composite image $C_{32}$ corresponding to composite image data generated by the image composition unit 263 (in the order of (B) to (C) of FIG. 11).

Therefore, the user can intuitively understand the moving direction of the imaging device 2, when playing back and confirming a shot moving image. Further, when the user plays back and views the shot moving image, even if the movement of the imaging device 2 changes the area of field of view, the image is gradually displayed along the moving direction of the imaging device 2 (e.g. in the order of (A), (B), and (C) of FIG. 11). Therefore, the area of field of view of the imaging device 2 is not suddenly changed, and miscellaneous objects are not displayed, so that comfortable viewing is allowed. Further, even if the area of field of view has been changed according to the movement of the imaging device 2, the image is gradually displayed along the moving direction of the imaging device 2, so that the user can catch up with the display to look and confirm it, and the image provides comfortable visibility without flickering.

Steps S211 to S220 correspond to the above-mentioned steps S108 to S117 of FIG. 2, respectively.

In step S206, when the end of the last image in the moving direction corresponding to the last image data recorded in the temporary recording unit 22 and the opposite end of the latest image in a direction opposite to the moving direction corresponding to the latest image data generated by the image sensor 21 cannot be combined (step S206: No), the imaging device 2 proceeds to step S221.

Next, the display control unit 265 displays, on the display unit 12, a warning of impossibility in combining an image by the image composition unit 263 (step S221). For example, on a live view image displayed on the display unit 12, the display control unit 265 superimposes letters, a symbol, or the like representing impossibility of combining, and displays the letters, symbol, or the like on the display unit 12.

Then, the display control unit 265 displays, on the display unit 12, the live view image corresponding to the image data generated by the image sensor 21 (step S222). For example, as illustrated in (D) of FIG. 11, the display control unit 265 displays, on the display unit 12, a live view image $LV_{32}$ corresponding to image data generated by the image sensor 21.

Steps S223 to S226 correspond to the above-mentioned steps S118 to S121 of FIG. 2, respectively.

In step S227, the display control unit 265 displays, on the display unit 12, the composite image corresponding to the composite image data generated by the image composition unit 263. For example, the composite image having been illustrated in FIG. 7 or FIG. 8 is displayed on the display unit 12. After step S227, the imaging device 2 proceeds to step S211.

Steps S228 to S230 correspond to the above-mentioned steps S123 to S125 of FIG. 2, respectively.

According to the above-mentioned second embodiment of the present invention, when the movement determination unit 262 determines that the area of field of view of the imaging device 2 has been changed, the display control unit 265 displays, on the display unit 12, a composite image as a live view image, corresponding to composite image data generated by the image composition unit 263. Therefore, even if the area of field of view is suddenly changed while shooting a moving image, comfortable visibility is provided for users.

According to the second embodiment of the present invention, the display control unit 265 reduces the size of a composite image co/responding to composite image data generated by the image composition unit 263, and displays the composite image on the display unit 12. Therefore, even if the composite image generated by the image composition unit 263 has a large displayed area, the composite image can be fully displayed.

According to the second embodiment of the present invention, until the movement determination unit 262 determines that the area of field of view of the imaging device 2 has not been changed, the image composition unit 263 generates composite image data obtained by superimposing overlapping areas in imaging regions of a plurality of images along a changing direction in which the area of field of view of the imaging device 2 has been changed. Therefore, even if the area of field of view is suddenly changed while shooting a moving image, comfortable visibility is provided for users, and the users can intuitively understand a panning direction while shooting the moving image.

Still further, according to the second embodiment of the present invention, when the movement determination unit 262 determines that an area of field of view of the imaging device 2 has not been changed after the image composition unit 263 generates composite image data, the image composition unit 263 combines a latest image corresponding to latest image data generated by the image sensor 21 with a last image area corresponding to last image data combined with a composite image, and updates the composite image. Accordingly, even if the area of field of view is suddenly changed while shooting a moving image, an image is not interrupted, and a current image corresponding to an area of field of view of the imaging device 2 is updated to be displayed on the display unit 12. Therefore, a desired object can be visually confirmed in real time.

According to the second embodiment of the present invention, when the movement determination unit 262 determines that the area of field of view of the imaging device 2 has not been changed, the display control unit 265 gradually eliminates an area of the composite image corresponding to older image data among a plurality of pieces of image data combined by the image composition unit 263 with elapse of time, and displays the composite image on the display unit 12. Therefore, even if the movement of the imaging device 2 is stopped, a displayed area of the image can be smoothly shifted while being reduced, and comfortable visibility is provided for users.

First Modification of Second Embodiment

Next, a first modification of the second embodiment of the present invention will be described. The second embodiment has been described as being applied to the panning for moving the imaging device 2 substantially horizontally, but can also be applied to tilting for moving the imaging device 2 substantially vertically.

Figure 12:
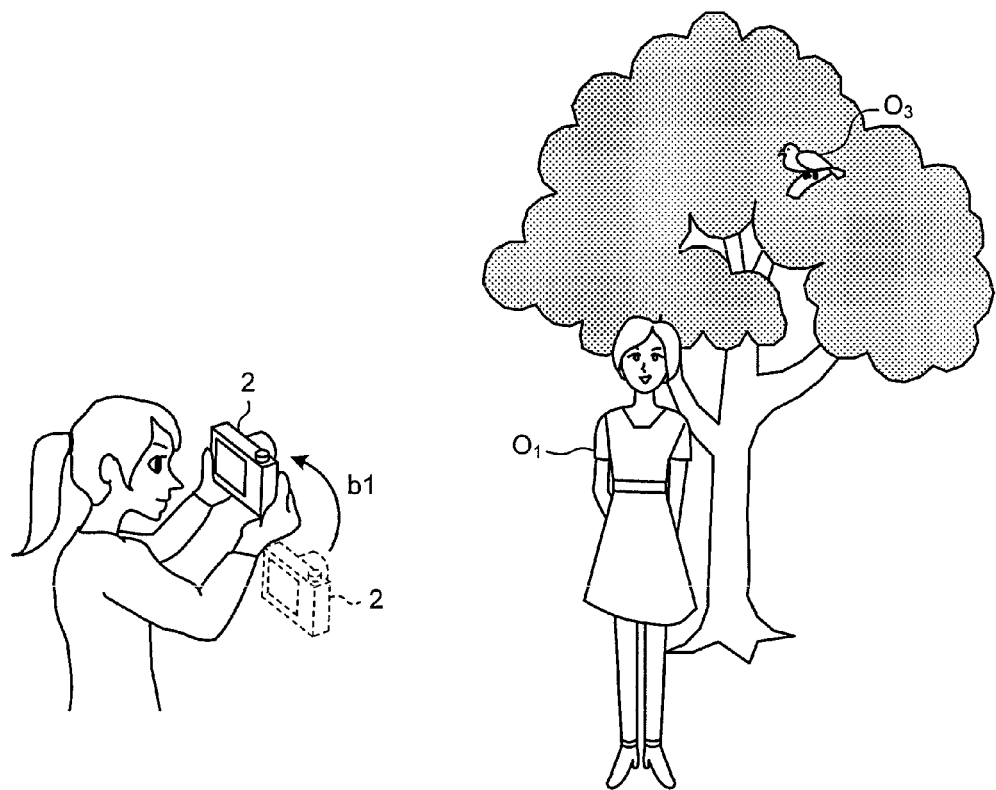
FIG. 12 is a schematic view illustrating a situation in which an imaging device according to a first modification of the second embodiment of the present invention is tilted by the user.
Figure 13:
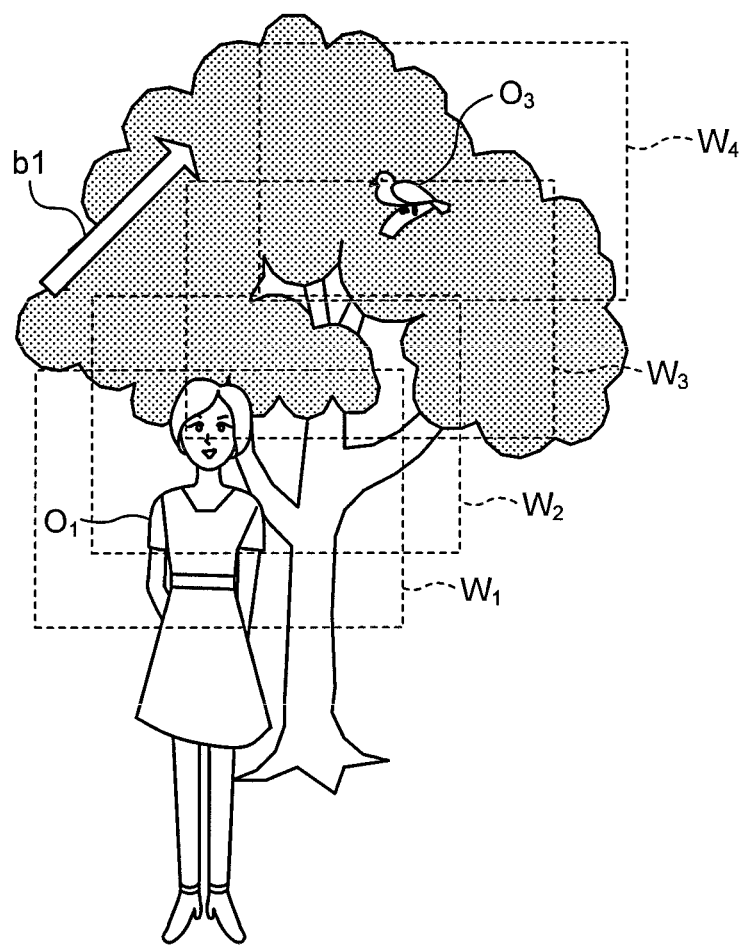
FIG. 13 is a schematic view illustrating change of an area of field of view of the imaging device under the situation illustrated in FIG. 12.
Figure 14:
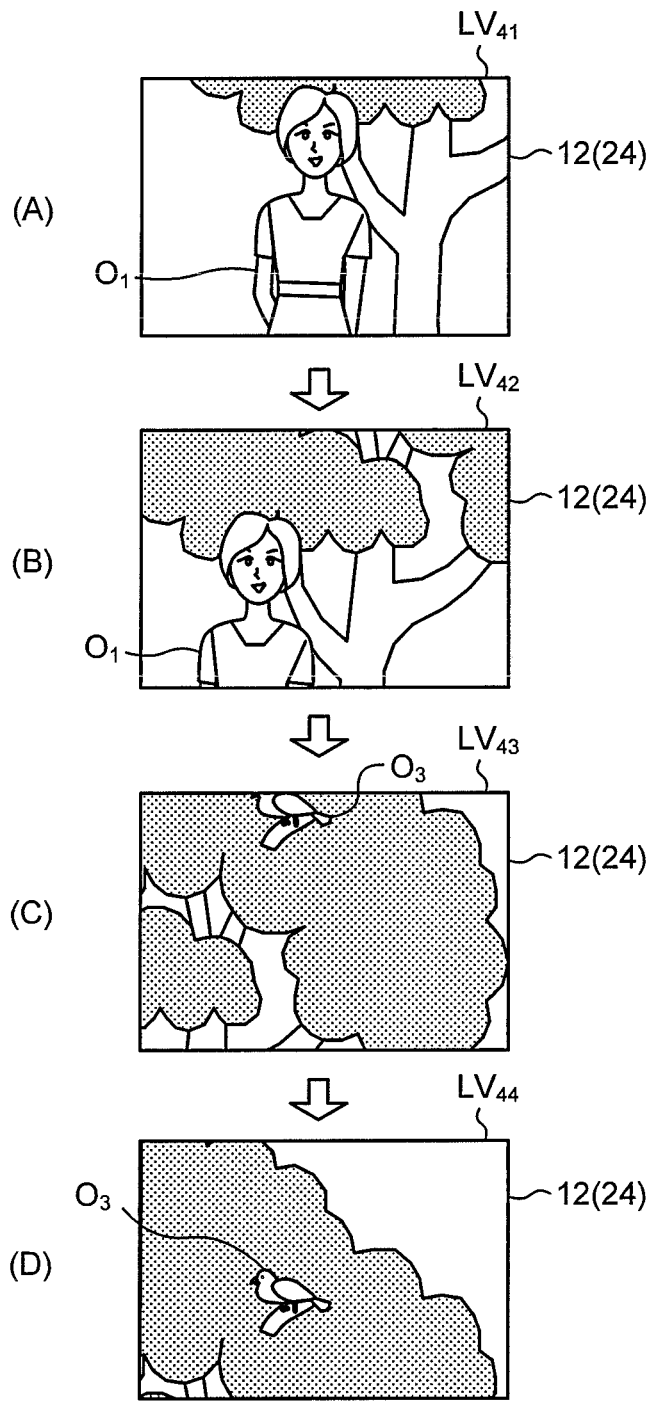
FIG. 14 is a schematic view illustrating an exemplary moving image displayed upon playback of the moving image having been shot by a conventional imaging device.
Figure 15:
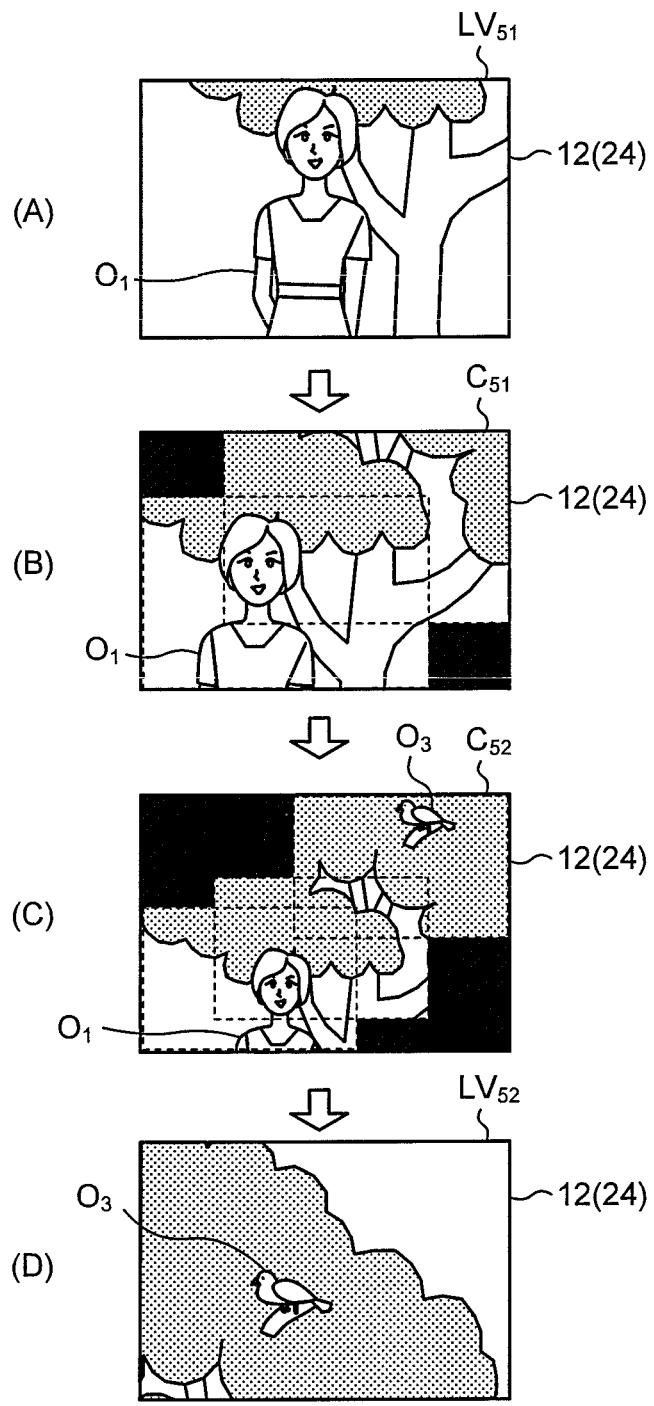
FIG. 15 is a schematic view illustrating an exemplary image displayed on a display unit of the imaging device according to the first modification of the second embodiment of the present invention.

FIG. 12 is a schematic view illustrating a situation in which the imaging device 2 is tilted by the user. FIG. 13 is a schematic view illustrating change of an area of field of view of the imaging device 2 under the situation illustrated in FIG. 12. FIG. 14 is a schematic view illustrating an exemplary moving image displayed upon playback of the moving image having been shot by a conventional imaging device. FIG. 15 is a schematic view illustrating an exemplary moving image displayed upon shooting a moving image by the imaging device 2. FIG. 12 is a schematic view illustrating a situation in which the imaging device 2 is moved in a substantially vertical direction (direction indicated by arrow b1), when images are shot ranging from an object $O_1$ to an object $O_2$. It is noted that, in FIG. 13, frames $W_1$ to $W_4$ represent areas of field of view (shooting areas) of the imaging device 2.

As illustrated in FIG. 12, when the user moves the imaging device 2 in a direction indicated by the arrow b1, the areas of field of view of the imaging device 2 are gradually changed (see frames $W_1$ to $W_4$ in FIG. 13). In such a situation, as illustrated in FIG. 14, the conventional imaging device displays time-sequentially live view images $LV_{41}$ to $LV_{44}$ on the display unit 12 (in the order of (A), (B), (C), and (D) of FIG. 14). Therefore, when a moving image is shot with a conventional imaging device, an area of field of view of the imaging device is suddenly changed, and the user viewing the moving image feels uncomfortable.

On the other hand, as illustrated in FIG. 15, while the display unit 12 displays a live view image $LV_{51}$, when the user moves the imaging device 2 in a substantially vertical direction, the image composition unit 263 sequentially combines temporally preceding and subsequent images to generate composite image data, and the display control unit 265 displays time-sequentially, on the display unit 12, a composite image $C_{51}$ and a composite image $C_{52}$ corresponding to the composite image data sequentially generated by the image composition unit 263 (in the order of (A), (B), and (C) of FIG. 15). At that time, the display control unit 265 displays, on the display unit 12, a composite image corresponding to the composite image data generated by the image composition unit 263 so that the composite image is displayed within a display area of the display unit 12. Then, when the movement of the imaging device 2 is stopped, the display control unit 265 displays, on the display unit 12, a live view image $LV_{52}$ corresponding to the image data generated by the image sensor 21 (in the order of (C) to (D) of FIG. 15).

According to the above-mentioned first modification of the second embodiment of the present invention, when the movement determination unit 262 determines that the area of field of view of the imaging device 2 has been changed, the display control unit 265 displays, on the display unit 12, a composite image as a live view image, corresponding to the composite image data generated by the image composition unit 263. Therefore, even if the area of field of view is suddenly changed while shooting a moving image, comfortable visibility is provided for users.

According to the first modification of the second embodiment of the present invention, the image composition unit 263 generates the new composite image data obtained by combining the latest image data generated by the image sensor 21 with the composite image data. However, for example, the image composition unit 263 may generate composite image data obtained by combining two pieces of temporally preceding and subsequent image data, and the display control unit 265 may display, on the display unit 12, a composite image corresponding to the composite image data generated by combining the two pieces of temporally preceding and subsequent image data by the image composition unit 263.

Figure 16:
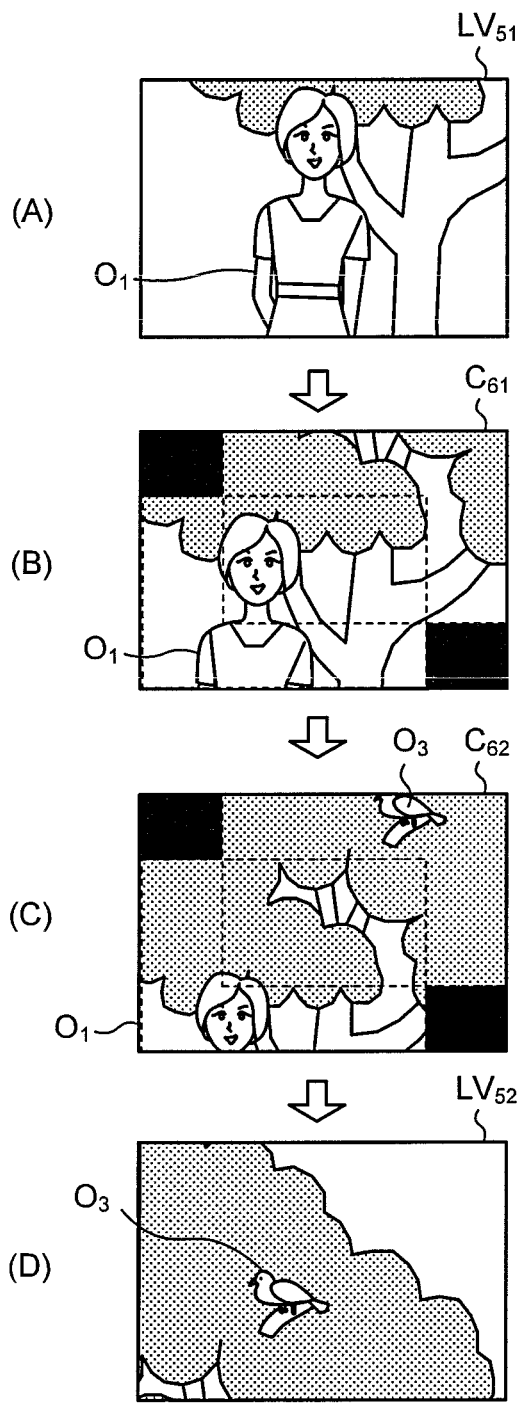
FIG. 16 is a schematic view illustrating another exemplary image displayed on the display unit of the imaging device according to the first modification of the second embodiment of the present invention.

Specifically, as illustrated in FIG. 16, the display control unit 265 sequentially displays, on the display unit 12, a composite image $C_{61}$ and a composite image $C_{62}$ corresponding to the composite image data generated by combining the two pieces of temporally preceding and succeeding image data by the image composition unit 263 (in the order of (A), (B), and (C) of FIG. 16). Then, when the movement of the imaging device 2 is stopped, the display control unit 265 displays, on the display unit 12, a live view image $LV_{52}$ corresponding to the image data generated by the image sensor 21 (in the order of (C) to (D) of FIG. 16). Therefore, even if the area of field of view of the imaging device 2 has been changed while shooting a moving image, comfortable visibility is provided for users. Further, since a composite image displayed on the display unit 12 is displayed along a moving direction of the imaging device 2, the user can intuitively understand the moving direction of the imaging device 2.

According to the first modification of the second embodiment of the present invention, the image composition unit 263 generates composite image data according to a determination result of the movement determination unit 262. However, for example, when the movement determination unit 262 determines that the imaging device 2 is moved, the display control unit 265 may reduce the size of an image corresponding to the image data continuously generated by the image sensor 21 to sequentially display the image on the display unit 12.

Figure 17:
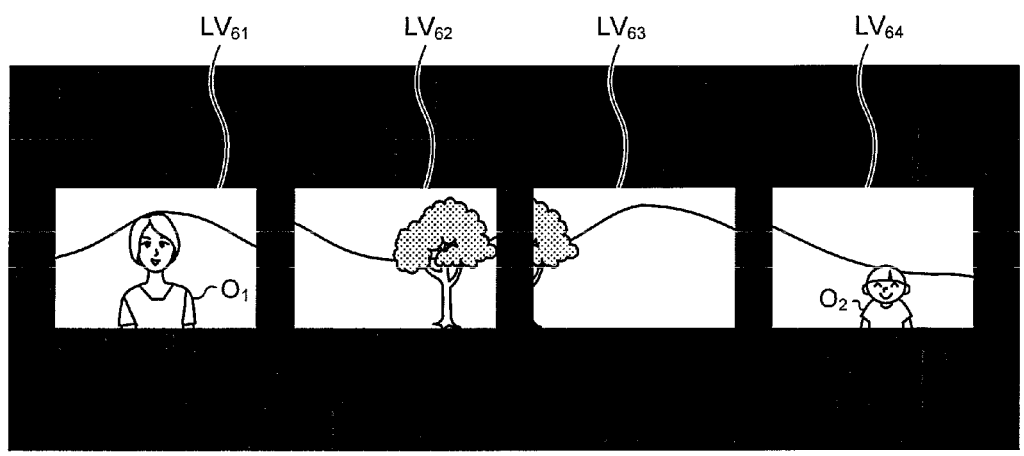
FIG. 17 is a schematic view illustrating another exemplary image displayed on the display unit of the imaging device according to the first modification of the second embodiment of the present invention.

Specifically, as illustrated in FIG. 17, the display control unit 265 displays, on the display unit 12, a list of an image $LV_{61}$, an image $LV_{62}$, an image $LV_{63}$, and an image $LV_{64}$ corresponding to the image data generated by the image sensor 21. In such a configuration, the display control unit 265 displays time-sequentially, on the display unit 12, images in a moving direction of the imaging device 2 according to a determination result of the movement determination unit 262. Therefore, even if the area of field of view of the imaging device 2 has been changed while shooting a moving image, comfortable visibility is provided for users.

Third Embodiment

Next, a third embodiment of the present invention will be described. An imaging device according to the third embodiment of the present invention has a configuration and processing which are different from those of the imaging device 2 according to the second embodiment described above. Specifically, in the second embodiment, when a photographer pans the imaging device 2 while shooting an imagP, a composite image sequentially combined is displayed as a live view image according to a moving direction. In the third embodiment, a composite image in which a shooting condition at the time of shooting an image is reflected is displayed when image data is played back. The configuration of the imaging device according to the third embodiment will be described, and then the processing performed by the imaging device according to the third embodiment will be described below. It is noted that the same reference signs will be used to refer to the same elements as those of the above-mentioned imaging device 2 according to the second embodiment, and description thereof will be omitted.

Figure 18:
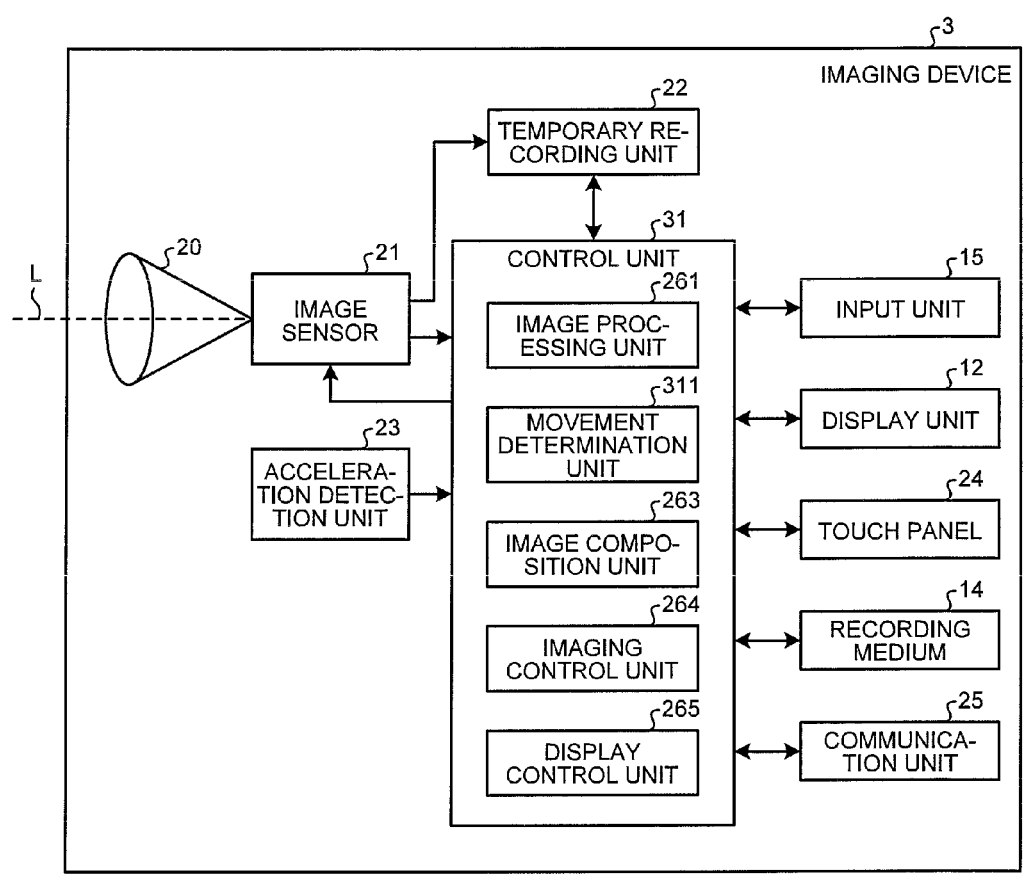
FIG. 18 is a block diagram illustrating a functional configuration of an imaging device according to a third embodiment of the present invention.

FIG. 18 is a block diagram illustrating a functional configuration of the imaging device according to the third embodiment of the present invention. As illustrated in FIG. 18, the imaging device 3 includes a display unit 12, a recording medium 14, an input unit 15, a lens portion 20, an image sensor 21, a temporary recording unit 22, an acceleration detection unit 23, a touch panel 24, a communication unit 25, and a control unit 31.

The control unit 31 performs transfer or the like of instructions or data corresponding to each unit of the imaging device 3 to integrally control operation of the imaging device 3. The control unit 31 includes a CPU or the like.

A detailed configuration of the control unit 31 will be described now. The control unit 31 includes an image processing unit 261, an image composition unit 263, an imaging control unit 264, a display control unit 265, and a movement determination unit 311.

The movement determination unit 311 determines whether an area of field of view of the imaging device 3 has been changed, based on a rate of change between two images corresponding to two pieces of temporally preceding and subsequent image data.

Figure 19:
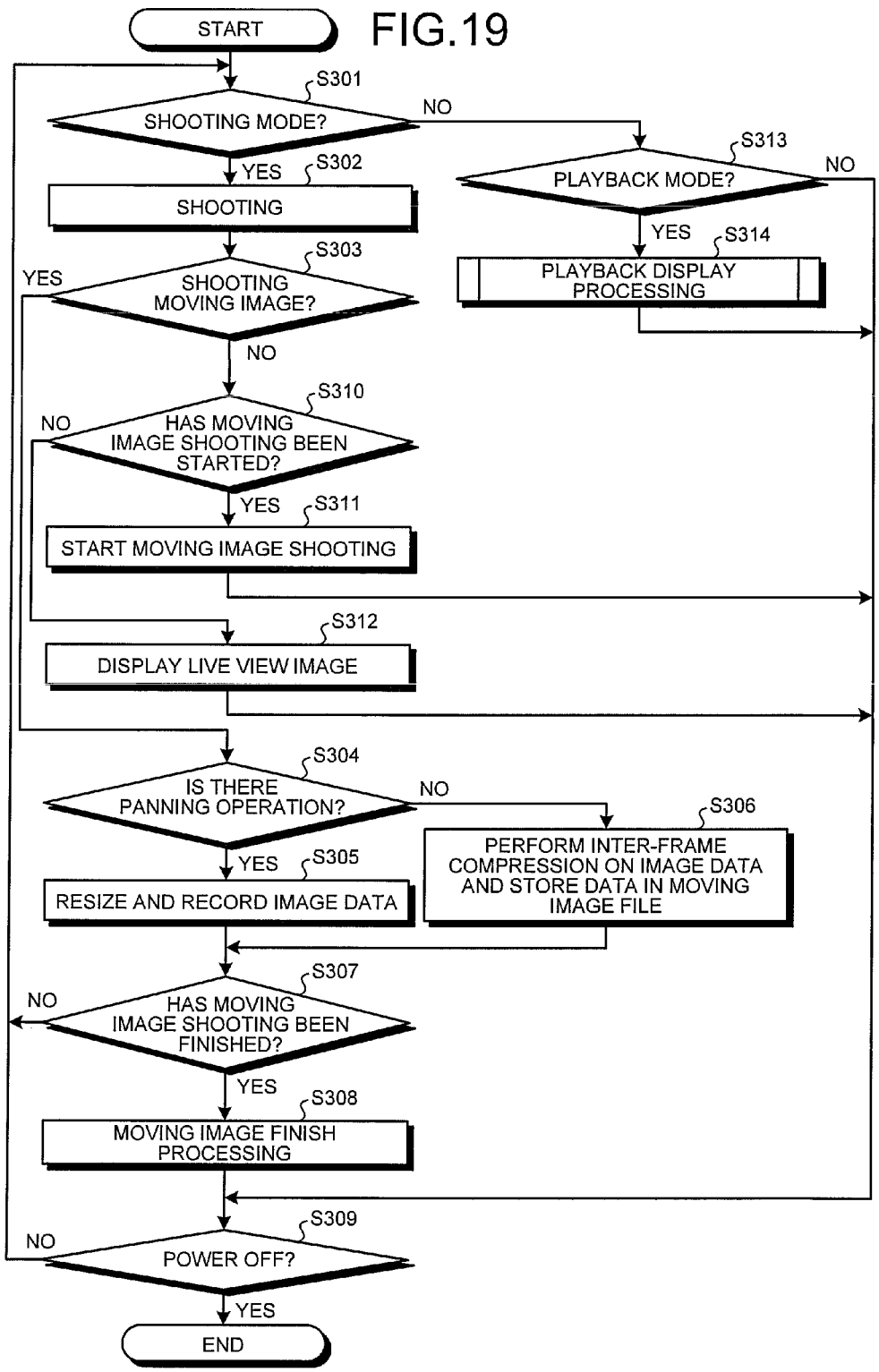
FIG. 19 is a schematic flowchart illustrating processing of the imaging device according to the third embodiment of the present invention.

Processing performed by the imaging device 3 having the above-mentioned configuration will be described. FIG. 19 is a schematic flowchart illustrating processing of the imaging device 3.

First, as illustrated in FIG. 19, the imaging device 3 being set to a shooting mode (step S301: Yes) will be described. In such a condition, the imaging control unit 264 causes the image sensor 21 to perform the shooting (step S302).

Next, while the imaging device 3 shoots a moving image (step S303: Yes), when the imaging device 3 is panned (step S304: Yes), the imaging control unit 264 resizes image data generated by the image sensor 21, and records the image data in a moving image file of the recording medium 14 (step S305). In such a condition, when image data generated by the image sensor 21 corresponds to a key frame in moving image data, the imaging control unit 264 performs resize processing for resizing the amount of data. On the other hand, when the image data generated by the image sensor 21 does not correspond to the key frame in the moving image data, the imaging control unit 264 performs resize processing for resizing the amount of data using temporal compression (inter-frame compression), spatial compression (intra-frame compression), or the like.

While the imaging device 3 shoots the moving image in step S303 (step S303: Yes), when the imaging device 3 is not panned (step S304: No), the imaging control unit 264 performs inter-frame compression such as temporal or spatial compression on the image data generated by the image sensor 21, and records the image data in the moving image file of the recording medium 14 (step S306).

After step S305 or step S306, when an instruction signal for instructing to finish shooting a moving image is input from the input unit 15 (step S307: Yes), the imaging device 3 performs moving image finish processing for specified processing on a moving image file generated in the recording medium 14 (step S308).

Next, when a power source of the imaging device 3 is turned off through the input unit 15 (step S309: Yes), the imaging device 3 finishes this processing. On the other hand, when the power source of the imaging device 3 is not turned off through the input unit 15 (step S309: No), the imaging device 3 proceeds to step S301.

When the instruction signal for finishing shooting a moving image is not input through the input unit 15 in step S307 (step S307: No), the imaging device 3 returns to step S301.

While the imaging device 3 is not shooting a moving image in step S303 (step S303: No), when an instruction signal for instructing to start shooting a moving image is input from the input unit 15 (step S310: Yes), the imaging device 3 starts shooting a moving image (step S311). In such a condition, the imaging control unit 264 generates, in the recording medium 14, a moving image file for time-sequentially recording image data sequentially generated by the image sensor 21. After step S311, the imaging device 3 proceeds to step S309.

While the imaging device 3 is not shooting a moving image in step S303 (step S303: No), when the instruction signal for instructing to start shooting a moving image is not input from the input unit 15 (step S310: No), the display control unit 265 causes the display unit 12 to display a live view image corresponding to the image data generated by the image sensor 21 (step S312). After step S311, the imaging device 3 proceeds to step S309.

The imaging device 3 not being set to a shooting mode in step S301 (step S301: No) will be described. In such a condition, when the imaging device 3 is set to a playback mode (step S313: Yes), the imaging device 3 performs playback display processing for playback of a file recorded in the recording medium 14 (step S314). Detailed description of playback display processing will be given below. After step S314, the imaging device 3 proceeds to step S309.

The imaging device 3 not being set to a shooting mode in step S301 (step S301: No) will be described. In such a condition, when the imaging device 3 is not set to the playback mode (step S313: No), the imaging device 3 proceeds to step S309.

Figure 20:
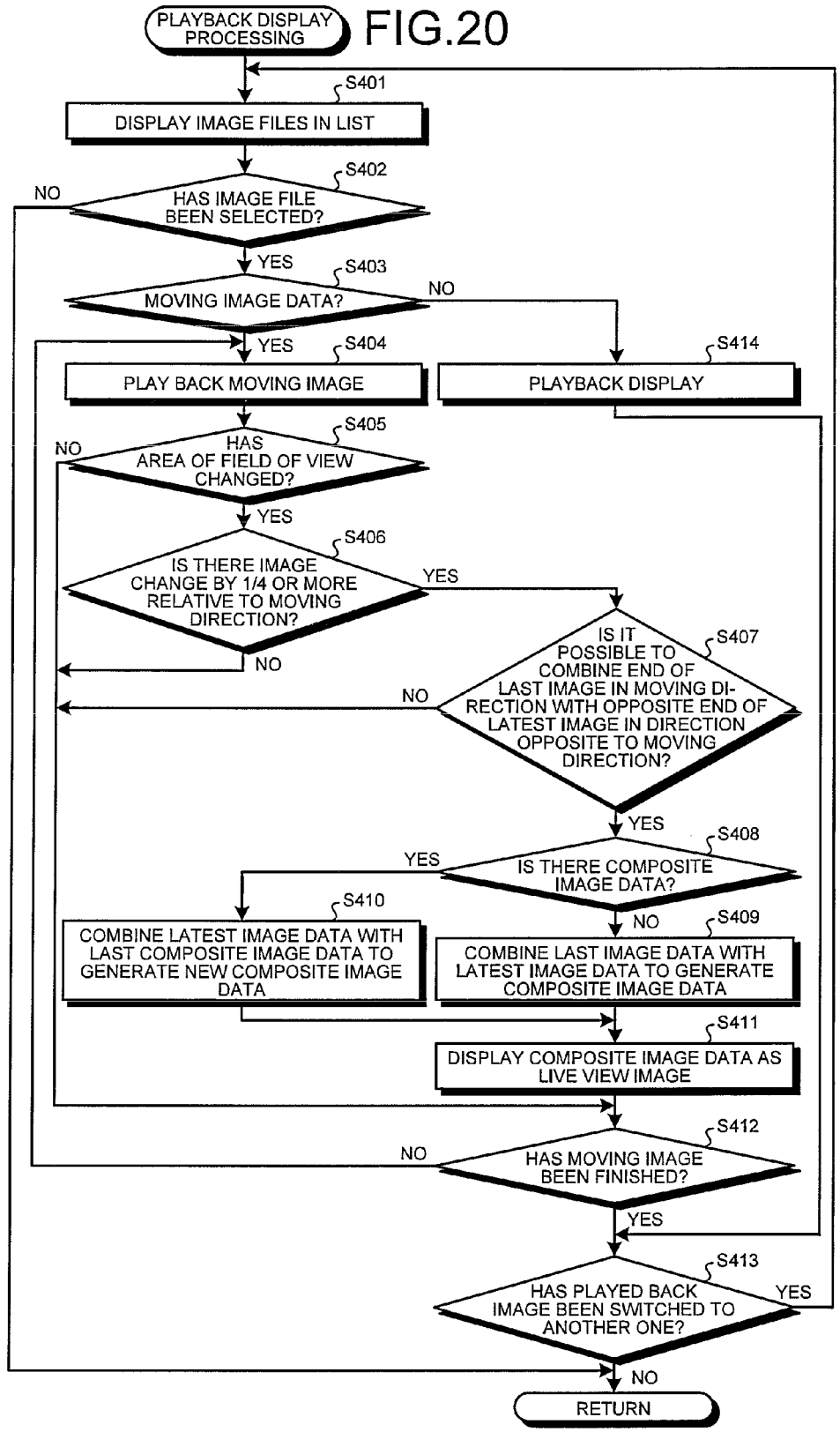
FIG. 20 is a schematic flowchart illustrating playback display processing of FIG. 19.

Next, detailed description of the playback display processing having been described in step S313 of FIG. 19 will be described. FIG. 20 is a schematic flowchart illustrating playback display processing.

First, as illustrated in FIG. 20, the display control unit 265 displays, on the display unit 12, a list of a plurality of image files recorded in the recording medium 14 (step S401).

Next, when an image file is selected from the list of the image files displayed on the display unit 12 through the input unit 15 (step S402: Yes), the imaging device 3 proceeds to step S403 which will be described below. On the other hand, when an image file is not selected from the list of the image files displayed on the display unit 12 through the input unit 15 (step S402: No), the imaging device 3 returns to a main routine of FIG. 19.

When the selected image file has moving image data in step S403 (step S403: Yes), the display control unit 265 plays back a moving image corresponding to the moving image data to display the moving image on the display unit 12 (step S404).

Next, the movement determination unit 311 determines, based on two pieces of temporally preceding and subsequent image data, whether the area of field of view of the imaging device 3 has been changed while shooting (step S405). Specifically, the movement determination unit 311 determines that the area of field of view of the imaging device 3 has been changed while shooting the image, when an object is changed or a variation in background exceeds a specified amount in two images corresponding to two pieces of temporally preceding and succeeding image data, such as key frames, or two pieces of temporally adjacent image data. When the movement determination unit 311 determines that the area of field of view of the imaging device 3 has been changed while shooting (step S405: Yes), the imaging device 3 proceeds to step S406 which will be described below. On the other hand, when the movement determination unit 311 determines that the area of field of view of the imaging device 3 has not been changed while shooting (step S405: No), the imaging device 3 proceeds to step S412 which will be described below.

In step S406, the movement determination unit 311 determines, based on temporally preceding and subsequent image data, whether there is image change by one-fourth or more relative to a moving direction of the imaging device 3 while shooting. When the movement determination unit 311 determines that there is image change by one-fourth or more relative to the moving direction of the imaging device 3 while shooting (step S406: Yes), the imaging device 3 proceeds to step S407 which will be described below. On the other hand, when the movement determination unit 311 determines that there is no image change by one-fourth or more relative to the moving direction of the imaging device 3 while shooting (step S406: No), the imaging device 3 proceeds to step S412 which will be described below.

Steps S407 to S411 correspond to the above-mentioned steps S206 to S210 of FIG. 10, respectively.

In step S412, after moving image data ends (step S412: Yes), when a played back image is switched to another one through the input unit 15 (step S413: Yes), the imaging device 3 returns to step S401.

In step S412, after the moving image data ends (step S412: Yes), when the played back image is not switched to another one through the input unit 15 (step S413: No), the imaging device 3 returns to the main routine of FIG. 19.

In step S412, while the moving image data does not end (step S412: No), the imaging device 3 returns to step S404.

In step S403, when a file selected from the plurality of files recorded in the recording medium 14 does not have moving image data (step S403: No), the imaging device 3 proceeds to step S414.

Next, the display control unit 265 plays back and displays an image corresponding to the image data on the display unit 12 (step S414). After step S414, the imaging device 3 proceeds to step S413.

According to the above-mentioned third embodiment of the present invention, when the movement determination unit 311 determines that the area of field of view of the imaging device 3 has been changed, the display control unit 265 displays, on the display unit 12, a composite image corresponding to composite image data generated by the image composition unit 263, as a live view image. Therefore, even if the area of field of view is suddenly changed while shooting a moving image, comfortable visibility is provided for users.

In the above-mentioned embodiments of the present invention, the composition is assumed, but a quick combining technique following quick movement is not necessarily assumed. That is, it is not always necessary to exactly join images as in panoramic composition. Recognition of panning during shooting of an image, or removal of visual discomfort is considered to be uniquely effective. Further, it is considered that, for example, even the arrangement of images reduced in size provides the present invention with a fully excellent effect, compared with other techniques. Three images having been illustrated in (C) of FIG. 15 may be arranged without being overlapped, or may be overlapped for only overwriting without combining.

Other Embodiments

An imaging device according to some embodiments can be applied to, for example, an electronic device such as a digital camera, a digital video camera, or a cellular phone or portable tablet device having an imaging function, a microscope or endoscope having a changeable area of field of view while shooting a moving image, in addition to a digital single-lens reflex camera.

Figure 21:
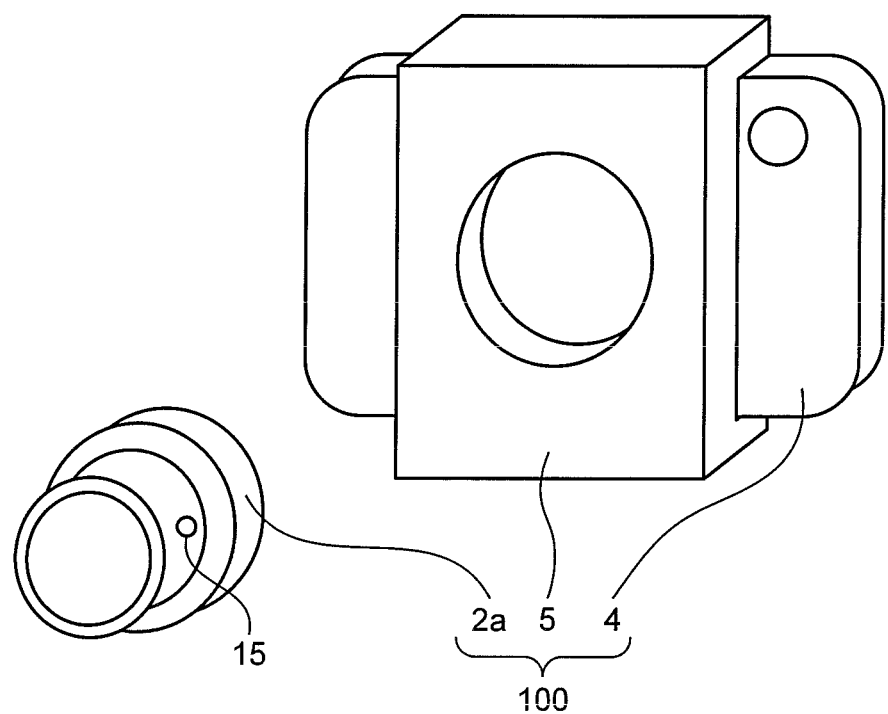
FIG. 21 is a schematic view illustrating a schematic configuration of an imaging system according to a modification of the first to third embodiments of the present invention.

In the imaging device according to some embodiments, the configuration of the display unit is not essentially employed, and image data generated by the may be wirelessly transmitted to and displayed on an external device, for example, a cellular phone or an electronic device. Specifically, as illustrated in FIG. 21, an imaging system 100 includes an imaging device 2a, a portable device 4, and an attachment 5 for connecting imaging device 2a and the portable device 4. The imaging device 2a and the portable device 4 are connected to each other so that information thereof can be transmitted and received using wireless or wire communication. Image data generated by the imaging device 2a may be displayed on a display unit (display monitor) of the portable device 4. Of course, the imaging device 2a may be configured to transmit only the image data to the portable device 4. In such a configuration, the portable device 4 may be provided with an image processing device according to some embodiments. The image processing device may subject a plurality of pieces of temporally continuous image data transmitted from the imaging device 2a to image processing, and display the processed data on the display unit of the portable device 4.

A program executed by the imaging device according to some embodiments is provided in the form of installable or executable file data which is recorded in a computer-readable recording medium such as a CD-ROM, a flexible disk (FD), a CD-R, a digital versatile disk (DVD), a USB medium, or a flash memory.

Alternatively, the program executed by the imaging device according to some embodiments may be stored on a computer connected to a network such as the Internet to be provided by being downloaded through the network. Further alternatively, the program executed by imaging device according to some embodiments may be configured to be provided or distributed through the network such as the Internet.

It is noted that, in the descriptions of the flowcharts in the specification, a context between the steps has been described using expressions such as "first", "then", and "next", but the order of processing necessary to carry out the present invention is not uniquely defined by the expressions. That is, the orders of processing in the flowcharts described in the specification can be modified within a range without contradiction.

The present invention, as has been described above, may include various embodiments which are not described in the specification, and may be variously modified in design or the like within the scope of the technical idea specified by the claims.

According to some embodiments, even if an area of field of view is suddenly changed while shooting a moving image, it is possible to provide comfortable visibility for users.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
a determination unit configured to determine, based on a plurality of pieces of image data which is generated by continuously taking images of a specified area of field of view and input from an imaging unit provided outside the image processing device, whether the area of field of view of the imaging unit has been changed;
an image composition unit configured to superimpose overlapping areas of imaging regions of a plurality of images corresponding to the plurality of pieces of image data along a direction in which the area of field of view of the imaging unit has been changed, to generate composite image data when the determination unit determines that the area of field of view of the imaging unit has been changed; and
a display control unit configured to cause a display unit provided outside the imaging processing device to display a composite image corresponding to the composite image data generated by the image composition unit, wherein
when the determination unit determines that the area of field of view of the imaging unit has not been changed after the composite image data is generated, the image composition unit combines images corresponding to the plurality of pieces of image data generated by the imaging unit immediately after determination by the determination unit, in a latest image area corresponding to a latest plurality of pieces of image data which is combined into the composite image data, to update the composite image data, and
the display control unit gradually reduces an aspect ratio or a display area of the composite image, and causes the display unit to display the composite image.

2. The image processing device according to claim 1, wherein when the determination unit determines that the area of field of view of the imaging unit has not been changed, the display control unit gradually eliminates an area of the composite image corresponding to older image data among the plurality of pieces of image data combined by the image composition unit, with elapse of time, and causes the display unit to display the composite image.

3. The image processing device according to claim 1, the determination unit determines whether the area of field of view of the imaging unit has been changed, based on a rate of change in imaging regions of two images corresponding to two pieces of image data.

4. The image processing device according to claim 1, further comprising an acceleration detection unit configured to detect acceleration of the image processing device, wherein the determination unit determines whether the area of field of view of the imaging unit has been changed, based on a change in the acceleration detected by the acceleration detection unit.

5. A display device comprising:
the image processing device according to claim 1;
the imaging unit; and
the display unit.

6. An image processing method executed by an image processing device, the method comprising:
determining, based on a plurality of pieces of image data which is generated by continuously taking images of a specified area of field of view and input from an imaging unit provided outside the image processing device, whether the area of field of view of the imaging unit has been changed;
superimposing overlapping areas of imaging regions of a plurality of images corresponding to the plurality of pieces of image data along a direction in which the area of field of view of the imaging unit has been changed, to generate composite image data when it is determined that the area of field of view of the imaging unit has been changed;
causing a display unit provided outside the imaging processing device to display a composite image corresponding to the composite image data, wherein
when it is determined that the area of field of view of the imaging unit has not been changed after the composite image data is generated, images corresponding to the plurality of pieces of image data generated by the imaging unit immediately after determination are combined in a latest image area corresponding to a latest plurality of pieces of image data which is combined into the composite image data, to update the composite image data,
gradually reducing an aspect ratio or a display area of the composite image; and
causing the display unit to display the composite image.

7. A non-transitory computer-readable recording medium with an executable program stored thereon, the program instructing an image processing device to perform:
determining, based on a plurality of pieces of image data which is generated by continuously taking images of a specified area of field of view and input from an imaging unit provided outside the image processing device, whether the area of field of view of the imaging unit has been changed;
superimposing overlapping areas of imaging regions of a plurality of images corresponding to the plurality of pieces of image data along a direction in which the area of field of view of the imaging unit has been changed, to generate composite image data when it is determined that the area of field of view of the imaging unit has been changed;
causing a display unit provided outside the imaging processing device to display a composite image corresponding to the composite image data, wherein
when it is determined that the area of field of view of the imaging unit has not been changed after the composite image data is generated, images corresponding to the plurality of pieces of image data generated by the imaging unit immediately after determination are combined in a latest image area corresponding to a latest plurality of pieces of image data which is combined into the composite image data, to update the composite image data, gradually reducing an aspect ratio or a display area of the composite image; and causing the display unit to display the composite image.

8. An image processing method executed by an image processing device, the method comprising:

determining, based on a plurality of pieces of image data which is generated by continuously taking images of a specified area of field of view and input from an imaging unit provided outside the image processing device, whether the area of field of view of the imaging unit has been changed;

superimposing overlapping areas of imaging regions of a plurality of images corresponding to the plurality of pieces of image data along a direction in which the area of field of view of the imaging unit has been changed, to generate composite image data when it is determined that the area of field of view of the imaging unit has been changed;

causing a display unit provided outside the imaging processing device to display a composite image corresponding to the composite image data generated by the image composition unit; and responsive to a determination that the area of field of view of the imaging unit has not been changed, gradually eliminating an area of the composite image corresponding to older image data among the plurality of pieces of image data combined by the image composition unit, with elapse of time, and causing the display unit to display the composite image, wherein when it is determined that the area of field of view of the imaging unit has not been changed after the composite image data is generated, images corresponding to the plurality of pieces of image data generated by the imaging unit immediately after determination are combined in a latest image area corresponding to a latest plurality of pieces of image data which is combined into the composite image data, to update the composite image data.

9. An image processing method executed by an image processing device, the method comprising:

determining, based on a plurality of pieces of image data which is generated by continuously taking images of a specified area of field of view and input from an imaging unit provided outside the image processing device, whether the area of field of view of the imaging unit has been changed based on a rate of change in imaging regions of two images corresponding to two pieces of image data;

superimposing overlapping areas of imaging regions of a plurality of images corresponding to the plurality of pieces of image data along a direction in which the area of field of view of the imaging unit has been changed, to generate composite image data when it is determined that the area of field of view of the imaging unit has been changed; and causing a display unit provided outside the imaging processing device to display a composite image corresponding to the composite image data generated by the image composition unit, wherein when it is determined that the area of field of view of the imaging unit has not been changed after the composite image data is generated, images corresponding to the plurality of pieces of image data generated by the imaging unit immediately after determination are combined in a latest image area corresponding to a latest plurality of pieces of image data which is combined into the composite image data, to update the composite image data.

10. An image processing method executed by an image processing device, the method comprising:

detecting acceleration of the image processing device;

determining, based on a plurality of pieces of image data which is generated by continuously taking images of a specified area of field of view and input from an imaging unit provided outside the image processing device, whether the area of field of view of the imaging unit has been changed based on a change in the acceleration detected by the acceleration detection unit;

superimposing overlapping areas of imaging regions of a plurality of images corresponding to the plurality of pieces of image data along a direction in which the area of field of view of the imaging unit has been changed, to generate composite image data when it is determined that the area of field of view of the imaging unit has been changed; and causing a display unit provided outside the imaging processing device to display a composite image corresponding to the composite image data generated by the image composition unit, wherein when it is determined that the area of field of view of the imaging unit has not been changed after the composite image data is generated, images corresponding to the plurality of pieces of image data generated by the imaging unit immediately after determination are combined in a latest image area corresponding to a latest plurality of pieces of image data which is combined into the composite image data, to update the composite image data.

* * * * *